United States Patent
Howe

(10) Patent No.: US 9,015,302 B2
(45) Date of Patent: Apr. 21, 2015

(54) SCHEDULED NETWORK MANAGEMENT

(75) Inventor: Wayne Richard Howe, Irvine, CA (US)

(73) Assignee: The Boeing Company, Chicago, IL (US)

(*) Notice: Subject to any disclaimer, the term of this patent is extended or adjusted under 35 U.S.C. 154(b) by 216 days.

(21) Appl. No.: 13/028,610

(22) Filed: Feb. 16, 2011

(65) Prior Publication Data
US 2012/0209971 A1 Aug. 16, 2012

(51) Int. Cl.
G06F 15/173 (2006.01)
H04L 29/06 (2006.01)
H04L 12/801 (2013.01)

(52) U.S. Cl.
CPC ............ *H04L 63/0428* (2013.01); *H04L 47/17* (2013.01)

(58) Field of Classification Search
CPC . H04L 49/205; H04L 49/602; H04L 49/3027; H04L 49/3018; H04L 47/17
USPC ............................ 709/223; 370/412–418, 428
See application file for complete search history.

(56) References Cited

U.S. PATENT DOCUMENTS

| | | | |
|---|---|---|---|
| 5,477,530 A | 12/1995 | Ahmadi et al. | |
| 6,038,230 A | 3/2000 | Ofek | |
| 6,259,695 B1 | 7/2001 | Ofek | |
| 6,272,131 B1 | 8/2001 | Ofek | |
| 6,272,132 B1 | 8/2001 | Ofek et al. | |
| 6,330,236 B1 * | 12/2001 | Ofek et al. | 370/369 |
| 6,377,579 B1 | 4/2002 | Ofek | |
| 6,385,198 B1 | 5/2002 | Ofek et al. | |
| 6,442,135 B1 | 8/2002 | Ofek | |
| 6,611,519 B1 | 8/2003 | Howe | |
| 6,674,754 B1 | 1/2004 | Ofek | |
| 6,718,080 B2 | 4/2004 | Ofek et al. | |
| 6,731,638 B1 | 5/2004 | Ofek | |
| 6,735,199 B1 | 5/2004 | Ofek | |
| 6,754,210 B1 | 6/2004 | Ofek | |
| 6,757,282 B1 | 6/2004 | Ofek | |
| 6,760,328 B1 | 7/2004 | Ofek | |
| 6,778,536 B1 | 8/2004 | Ofek et al. | |
| 6,885,664 B2 | 4/2005 | Ofek et al. | |

(Continued)

FOREIGN PATENT DOCUMENTS

WO 2010123834 A1 10/2010

OTHER PUBLICATIONS

EP search report dated Jul. 12, 2012 regarding application 12155844.9-1244, applicant The Boeing Company, reference P53855EP/RGBH, 5 Pages.

(Continued)

*Primary Examiner* — Andrew Chriss
*Assistant Examiner* — Peter Mak
(74) *Attorney, Agent, or Firm* — Yee & Associates, P.C.

(57) ABSTRACT

A method and apparatus for managing a network. Signals are received from a plurality of time sources. A signal having a desired level of accuracy is selected from the signals. A reference time in the network is established using the signal. Data to be transmitted through the network is encrypted to form encrypted data. The encrypted data includes a number of encrypted headers and an encrypted body. A next node in the network is identified based on a destination for the encrypted data. A request is generated to reserve a number of time intervals for transmitting the encrypted data to the next node through the network. The encrypted data is transmitted in the network during the number of time intervals responsive to receiving an approval for the request from the next node.

51 Claims, 18 Drawing Sheets

(56) References Cited

U.S. PATENT DOCUMENTS

| | | |
|---|---|---|
| 6,970,648 B2 | 11/2005 | Ofek et al. |
| 6,973,090 B2 | 12/2005 | Ofek et al. |
| 6,982,979 B2 | 1/2006 | Ofek et al. |
| 7,035,247 B2 | 4/2006 | Ofek et al. |
| 7,042,392 B2 | 5/2006 | Whelan et al. |
| 7,110,669 B2 | 9/2006 | Ofek et al. |
| 7,139,277 B2 | 11/2006 | Ofek et al. |
| 7,170,906 B2 | 1/2007 | Ofek et al. |
| 7,177,308 B2 | 2/2007 | Ofek et al. |
| 7,305,704 B2 | 12/2007 | Ofek et al. |
| 7,307,989 B2 | 12/2007 | Ofek et al. |
| 7,324,510 B2 | 1/2008 | Howe |
| 7,343,619 B2 | 3/2008 | Ofek et al. |
| 7,367,045 B2 | 4/2008 | Ofek et al. |
| 7,372,400 B2 | 5/2008 | Cohen et al. |
| 7,398,398 B2 | 7/2008 | Ofek et al. |
| 7,426,206 B1 | 9/2008 | Ofek et al. |
| 7,468,696 B2 | 12/2008 | Bornholdt |
| 7,489,926 B2 | 2/2009 | Whelan et al. |
| 7,509,687 B2 | 3/2009 | Ofek et al. |
| 7,554,481 B2 | 6/2009 | Cohen et al. |
| 7,555,128 B2 * | 6/2009 | Ko et al. .................. 380/270 |
| 7,579,986 B2 | 8/2009 | DiEsposti |
| 7,579,987 B2 | 8/2009 | Cohen et al. |
| 7,583,225 B2 | 9/2009 | Cohen et al. |
| 7,619,559 B2 | 11/2009 | DiEsposti |
| 7,643,794 B2 | 1/2010 | Ofek et al. |
| 7,688,261 B2 | 3/2010 | DiEsposti |
| 7,701,393 B2 | 4/2010 | Bornholdt |
| 7,783,301 B2 | 8/2010 | Bornholdt |
| 7,859,455 B2 | 12/2010 | Gutt et al. |
| 2002/0042875 A1 * | 4/2002 | Shukla .................. 713/151 |
| 2003/0189922 A1 | 10/2003 | Howe |
| 2003/0201935 A1 * | 10/2003 | King et al. ............... 342/357.15 |
| 2005/0058149 A1 * | 3/2005 | Howe .................. 370/428 |
| 2005/0159891 A1 | 7/2005 | Cohen et al. |
| 2008/0056294 A1 * | 3/2008 | Maeda et al. ............. 370/437 |
| 2008/0059059 A1 | 3/2008 | Cohen et al. |
| 2008/0214175 A1 * | 9/2008 | Papadoglou et al. ...... 455/422.1 |
| 2009/0174597 A1 | 7/2009 | DiLellio et al. |
| 2009/0228210 A1 | 9/2009 | Gutt |
| 2009/0315764 A1 | 12/2009 | Cohen et al. |
| 2009/0315769 A1 | 12/2009 | Whelan et al. |
| 2010/0265128 A1 | 10/2010 | Martens et al. |

OTHER PUBLICATIONS

Hunt et al., "Information Distribution System Using Quantum Entanglement in a Timed Network Delivery System," U.S. Appl. No. 13/447,628, filed Apr. 16, 2012, 118 pages.

"ANU Quantum Optics: Secure Quantum Communication," Australian National University, 2 Pages, accessed Mar. 15, 2012 http://photonics.anu.edu.au/qoptics/Research/securequantumcom.html.

* cited by examiner

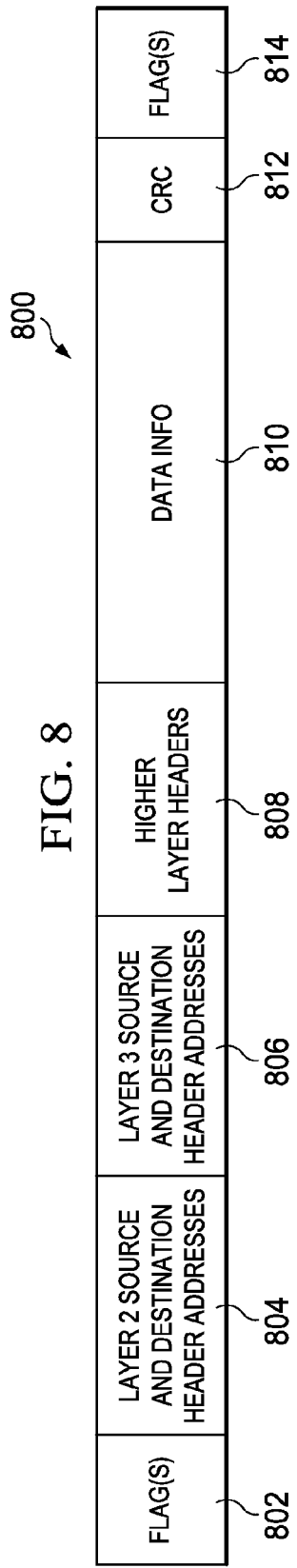
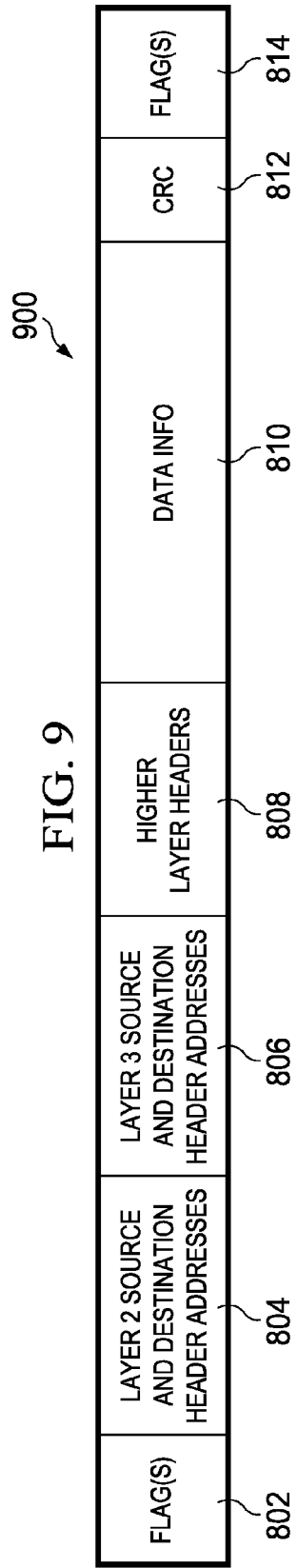
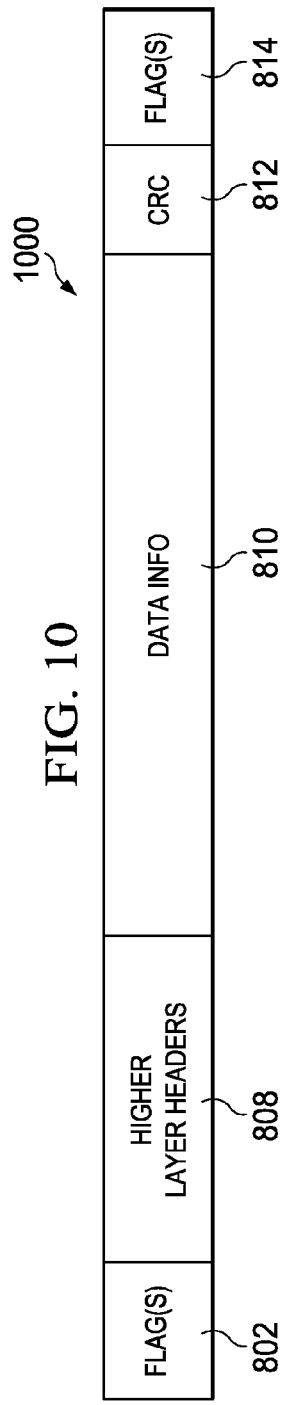
FIG. 8
FIG. 9
FIG. 10

FIG. 14

1400 — L1 EVENT SCHEDULE

| | Time | | | | | Input(s)/Source | Output(s)/Destination | Status | Time to Kill? | Time Offset to Next Node | Propagation Delay to Next Node |
|---|---|---|---|---|---|---|---|---|---|---|---|
| dd | hh | mm | ss | mmm | μμμ | n | | | | | |
| 01 | 12 | 00 | 00 | 000 | 000 | 0 | In₁ Edge | Out₁ Edge | Scheduled | xxx | -150 nsec. | 10 μsec. |
| 01 | 12 | 00 | 00 | 000 | 000 | 0 | In₁ Edge | Out₂ | Tentative | yyy | +0.9 μsec. | 50 μsec. |
| 01 | 12 | 00 | 00 | 000 | 000 | 0 | In₁ Edge | Out₃ | Available | zzz | | |
| 01 | 12 | 00 | 00 | 000 | 000 | 0 | In₁ Edge | Outₙ | Available | zzz | | |
| 01 | 12 | 00 | 00 | 000 | 000 | 0 | In₂ | Out₁ Edge | Available | zzz | | |
| 01 | 12 | 00 | 00 | 000 | 000 | 0 | In₂ | Out₂ | Available | zzz | | |
| 01 | 12 | 00 | 00 | 000 | 000 | 0 | In₂ | Out₃ | Available | zzz | | |
| 01 | 12 | 00 | 00 | 000 | 000 | 0 | In₂ | Outₙ | Available | zzz | | |
| 01 | 12 | 00 | 00 | 000 | 000 | 0 | In₃ | Out₁ Edge | Available | zzz | | |
| 01 | 12 | 00 | 00 | 000 | 000 | 0 | In₃ | Out₂ | Available | zzz | | |
| 01 | 12 | 00 | 00 | 000 | 000 | 0 | In₃ | Out₃ | Available | zzz | | |
| 01 | 12 | 00 | 00 | 000 | 000 | 0 | In₃ | Outₙ | Available | zzz | | |
| 01 | 12 | 00 | 00 | 000 | 000 | 0 | Inₙ | Out₁ Edge | Available | zzz | | |
| 01 | 12 | 00 | 00 | 000 | 000 | 0 | Inₙ | Out₂ | Available | zzz | | |
| 01 | 12 | 00 | 00 | 000 | 000 | 0 | Inₙ | Out₃ | Available | zzz | | |
| 01 | 12 | 00 | 00 | 000 | 000 | 0 | Inₙ | Outₙ | Available | zzz | | |
| 01 | 12 | 00 | 00 | 000 | 000 | 1 | In₁ Edge | Out₁ Edge | Scheduled | zzz | | |
| 01 | 12 | 00 | 00 | 000 | 000 | 1 | In₁ Edge | ... | Tentative | zzz | | |
| 01 | 12 | 30 | 00 | 000 | 000 | 0 | In₁ Edge | Out₁ Edge | Reserved | zzz ... | | |
| 01 | 12 | 59 | 59 | 999 | 999 | 9 | Inₙ | Outₙ | Reserved | zzz | | |

SCHEDULED NETWORK MANAGEMENT

BACKGROUND INFORMATION

1. Field

The present disclosure relates generally to managing networks and, in particular, to managing nodes in a network. Still more particularly, the disclosure relates to a method and apparatus for managing a network, managing an inconsistency in a network, and configuring a node.

2. Background

Computer networks are frequently used to transmit and receive data between computers. A computer network is a collection of communication channels that allows a computer to transmit data to another computer. For example, an Ethernet network or a TCP/IP network are examples of computer networks. A network may include a wired network, a wireless network, an optical network, or another suitable type of connectivity.

Data is commonly transmitted from a first computer to a second computer through the network when the second computer is not directly connected to the first computer. In other words, the first and second computers do not share a common communication link. For example, a computer connected to a network in New York City is unlikely to be directly connected to a computer in Los Angeles.

Instead, the first computer communicates with a third computer that is directly connected to the first computer. The first computer sends the data to the third computer with an indication of the destination for the data. The indication may consist of an address in a header for the data. The third computer receives the data and identifies the destination of the data contained in the headers. The third computer then determines which computer is directly connected to the third computer and is the next computer to receive data intended for the destination of the data. The third computer then transmits the data to the next computer. The process may be repeated by a number of computers until the data is received by the second computer.

While this illustrative example is described with respect to computers, the data may be transmitted instead by nodes. A node is a device in the network that transmits and receives data. One example of a node is a router. A node may also comprise a computer or a switch.

Nodes in the network process data that is received and transmit the data to other nodes based on the destination described by a header in the data. However, when the amount of data being transmitted through the network increases beyond the processing speed of one or more nodes, the data may be delayed in reaching the destination for the data. For example, the data may take several multiples of time longer to reach the destination for the data when the amount of data being transmitted through the network is beyond the processing speed of one or more nodes. The delay is referred to as network congestion.

When the network is experiencing network congestion, data may be delayed or lost while being transmitted in the network. In such illustrative examples, retransmitting the data may still not cause the data to arrive at the destination, since the network is still experiencing network congestion.

Therefore, it would be advantageous to have a method and apparatus that takes into account at least some of the issues discussed above, as well as possibly other issues.

SUMMARY

In one advantageous embodiment, an apparatus includes a time management system, a cryptography system, a network reservation system, and a network interface. The time management system is configured to receive signals from a plurality of time sources, select a signal having a desired level of accuracy from the signals, and set a reference time in a network associated with the time management system using the signal. The cryptography system is configured to encrypt data to be transmitted through the network to form encrypted data. The encrypted data includes a number of encrypted headers and an encrypted body. The network reservation system is configured to identify a next node in the network based on a destination for the encrypted data and generate a request to reserve a number of time intervals for transmitting the encrypted data to the next node through the network. A time interval is a time between transmission of the encrypted data by the network using the reference time. The network interface is configured to transmit the encrypted data in the network during the number of time intervals responsive to receiving an approval for the request from the next node.

In another advantageous embodiment, a method is provided for managing a network. Signals are received from a plurality of time sources. A signal having a desired level of accuracy is selected from the signals. A reference time in the network is set using the signal. Data is encrypted to be transmitted through a network to form encrypted data. The encrypted data comprises a number of encrypted headers and an encrypted body. A next node in the network is identified based on a destination for the encrypted data. A request is generated to reserve a number of time intervals for transmitting the encrypted data to the next node through the network. A time interval is a time between transmission of the encrypted data in the network using the reference time. The encrypted data is transmitted in the network during the number of time intervals in response to receiving an approval for the request from the next node.

In yet another advantageous embodiment, an apparatus includes a time management system, a network reservation system, a network interface, and an inconsistency management system. The time management system is configured to set a reference time for a source node in a network associated with the time management system using a signal. The network reservation system is configured to identify a plurality of next nodes associated with the source node based on a destination for data to be transmitted by the source node through the network and generate a request to reserve a first number of time intervals with each of the plurality of next nodes for transmitting the data and a second number of time intervals with each of the plurality of next nodes for receiving response data. A time interval is a time between transmission of the data by the source node in the network using the reference time. The network interface is configured to transmit the data during the first number of time intervals to a first next node in the plurality of next nodes responsive to receiving an approval for the request from the first next node. The inconsistency management system is configured to identify an inconsistency in the network through the first next node in the plurality of next nodes, cause the network interface to cease transmitting the data to the first next node in the plurality of next nodes, and further cause the network interface to transmit the data to a second next node in the plurality of next nodes during the first number of time intervals responsive to identifying the inconsistency.

In still yet another advantageous embodiment, a method for managing an inconsistency in a network are provided. A reference time for a source node in a network is set using a signal. A plurality of next nodes associated with the source node is identified based on a destination for data to be transmitted by the source node through the network. A request to reserve a first number of time intervals is generated with each of the plurality of next nodes for transmitting the data and a second number of time intervals with each of the plurality of next nodes for receiving response data. A time interval is a time between transmission of the data by the source node in the network using the reference time. Data is transmitted during the first number of time intervals to a first next node in the plurality of next nodes responsive to receiving an approval for the request from the first next node. Transmitting the data to the first next node is ceased and the data is transmitted to a second next node in the plurality of next nodes during the first number of time intervals in response to identifying an inconsistency in the network through the first next node in the plurality of next nodes.

In one advantageous embodiment, an apparatus includes a time management system, a node configuration system, a network reservation system, and a network interface. The time management system is configured to set a reference time for a first node in a network associated with the time management system using a signal. The node configuration system is configured to identify, using configuration data, a plurality of nodes associated with the first node, a first number of time intervals with each of the plurality of nodes for receiving a request, and a second number of time intervals with the each of the plurality of nodes for transmitting the request. A time interval is a time between transmission of the request by the first node in the network using the reference time. The network reservation system is configured to receive, during the first number of time intervals, the request from a second node in the plurality of nodes to transmit data to the first node during a third number of time intervals, determine whether the third number of time intervals is available for the first node, and send an approval to the second node during the second number of time intervals in response to a determination that the third number of time intervals is available for the first node. The network interface is configured to receive the data during the third number of time intervals.

In another advantageous embodiment, a method for configuring a node is provided. A reference time for a first node is set in a network using a signal. A plurality of nodes associated with the first node, a first number of time intervals with each of the plurality of nodes for receiving a request, and a second number of time intervals with the each of the plurality of nodes for transmitting the request are identified using configuration data. A time interval is a time between transmission of the request by the first node in the network using the reference time. The request from a second node in the plurality of nodes is received during the first number of time intervals to transmit data to the first node during a third number of time intervals. A determination is made as to whether the third number of time intervals is available for the first node. An approval is sent to the second node during the second number of time intervals in response to a determination that the third number of time intervals is available for the first node. The data is received during the third number of time intervals.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 8 is an illustration of data in accordance with an advantageous embodiment;

FIG. 9 is an illustration of encrypted data in accordance with an advantageous embodiment;

FIG. 10 is an alternative illustration of encrypted data in accordance with an advantageous embodiment;

FIG. 14 is an illustration of a schedule in accordance with an advantageous embodiment;

DETAILED DESCRIPTION

Figure 1:
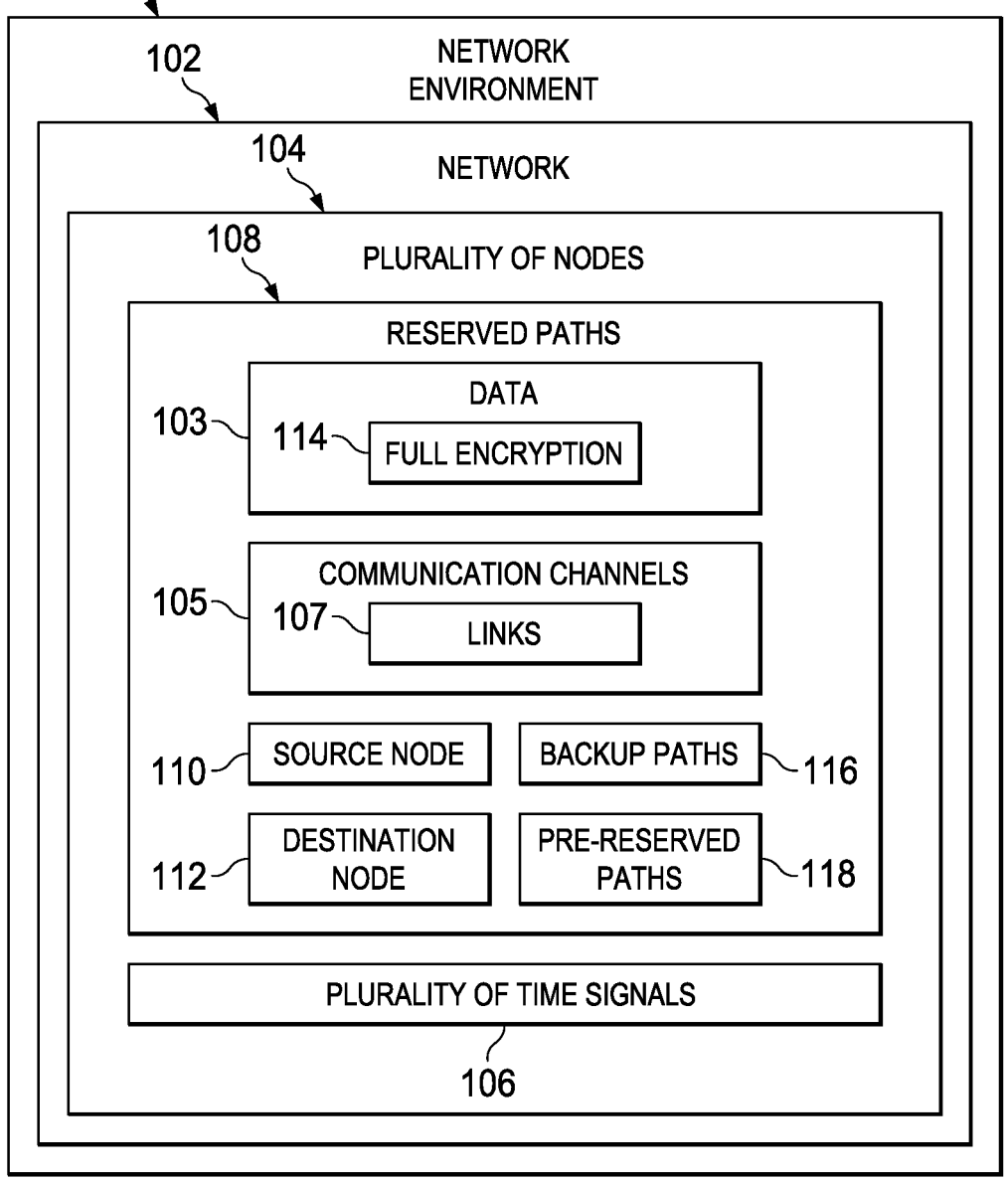
FIG. 1 is an illustration of a taxonomy of a network in accordance with an advantageous embodiment.

Referring more particularly to the drawings, and specifically to FIG. 1, an illustration of a taxonomy of a network is depicted in accordance with an advantageous embodiment. Network environment 100 is an example of an environment in which advantageous embodiments may be implemented.

Network environment 100 contains network 102. Network 102 is a collection of communication channels 105 that allow a node to transmit data 103 to other nodes and receive data 103 from other nodes connected to the network. In this advantageous embodiment, communication channels 105 include links 107. Links 107 are connections between plurality of nodes 104 in network 102. For example, links 107 may include 100Base-T Ethernet and/or 802.11n connections. For example, without limitation, nodes may include computers, switches, and routers, and network 102 may be an Ethernet and/or transmission control protocol/Internet Protocol (TCP/IP) network. Of course, network 102 may be a wired, wireless, optical, free-space, or other suitable type of network. In these illustrative examples, an optical network is a network that includes physical connections in which data is transmitted using light. A free-space network is a network that includes devices that transmit data through free space. In other words, a free-space network does not use physical connections to transmit data.

Network 102 contains plurality of nodes 104. Each node in plurality of nodes 104 is a device connected to network 102. A device is connected to network 102 by being connected to at least one other node in network 102. In these illustrative examples, each of plurality of nodes 104 receives plurality of time signals 106 containing time information. Plurality of time signals 106 is a number of signals obtained from a number of time sources that includes information about the reference time. In some advantageous embodiments, the number of signals is received from the number of time sources.

In these illustrative examples, the reference time received may include an absolute time, a current time, a relative time, a synchronized time, or another suitable type of time. An absolute time is the time in the physical world. For example, 5:03:24.123 PM on Feb. 1, 2011 AD is an absolute time. Of course, the level of precision in the absolute time may vary in the different advantageous embodiments. A current time may be the local time, which may be agreed upon between nodes. A relative time is a time established with respect to a common reference time.

For example, if two nodes establish a reference time common to both nodes, and each node then counts 100 microseconds, each node has established a relative time of 100 microseconds relative to the common reference time. A synchronized time is a time at which plurality of nodes 104 agrees upon a common reference time. Each node may begin incrementing units of time once the common reference time is established. For example, plurality of nodes 104 may begin counting the number of hundredths of a second that have elapsed since the moment plurality of time signals 106 is established. Of course, the precision of the synchronized time may differ in the different advantageous embodiments.

In these illustrative examples, plurality of nodes 104 generates reserved paths 108 in network 102. Reserved paths 108 are routes through network 102 that include one or more of plurality of nodes 104. Each reserved path has source node 110 and destination node 112. Reserved paths 108 may also include other nodes between source node 110 and destination node 112. Source node 110 is the node that first transmits data 103 through network 102. Destination node 112 is the node for which data 103 is intended and/or addressed.

Reserved paths 108 are generated using requests sent by one node in network 102 to one or more other nodes in network 102. A reserved path in reserved paths 108 represents a collection of nodes and one or more time intervals in which data 103 may be sent through the network. More specifically, each node along the reserved path may use a request to identify time intervals during which data 103 is to be sent from one node to another node. The time intervals may differ between pairs of nodes. In other words, the time interval for transmitting data 103 from source node 110 to a first node may differ from the time intervals during which the first node may transmit data 103 to destination node 112.

Once reserved paths 108 are formed, source node 110 may encrypt data 103 prior to sending data 103 through network 102. In these illustrative examples, source node 110 may use full encryption 114. Full encryption 114 is encryption of the entirety of data 103. Full encryption 114 includes encryption of all the headers of data 103. In this advantageous embodiment, the headers for data 103 include source information; destination information; flags; error checking information, such as Cyclical Redundancy Checks (CRC); or other suitable information in headers. In other words, none of data 103 remains unencrypted in these examples. Thus, data 103 is received and transmitted by each node along the reserved path until destination node 112 receives the encrypted data. With the exception of destination node 112, the nodes along the reserved path do not decrypt the destination information or the data, since each node receives the encrypted data during one reserved time interval and sends the data during another reserved time interval.

In other advantageous embodiments, an inconsistency may develop in network 102. For example, a node that is along a reserved path in reserved paths 108 from source node 110 to destination node 112 may develop an inconsistency such that the node may be unable to transmit or receive data. In such advantageous embodiments, when a request for the number of time intervals is sent to a second node by source node 110, source node 110 may also send a request for another number of time intervals to another node in plurality of nodes 104. The other node may transmit data to destination node 112. In other words, additional reserved paths 108, known as backup paths 116, may be generated to be used in the event an inconsistency develops in the reserved path being used to transmit data 103.

In yet other advantageous embodiments, plurality of nodes 104 may include pre-reserved paths 118. In such advantageous embodiments, each node may be configured to use a number of time intervals in sending and receiving data 103 with particular nodes in plurality of nodes 104. The addresses of the particular nodes and the number of time intervals may be contained in a data source connected to the node. Alternatively, the number of time intervals and addresses may be configured by a user input. In yet other advantageous embodiments, the number of time intervals and addresses are received in messages transmitted to nodes being joined to network 102 by nodes already in network 102.

Figure 2:
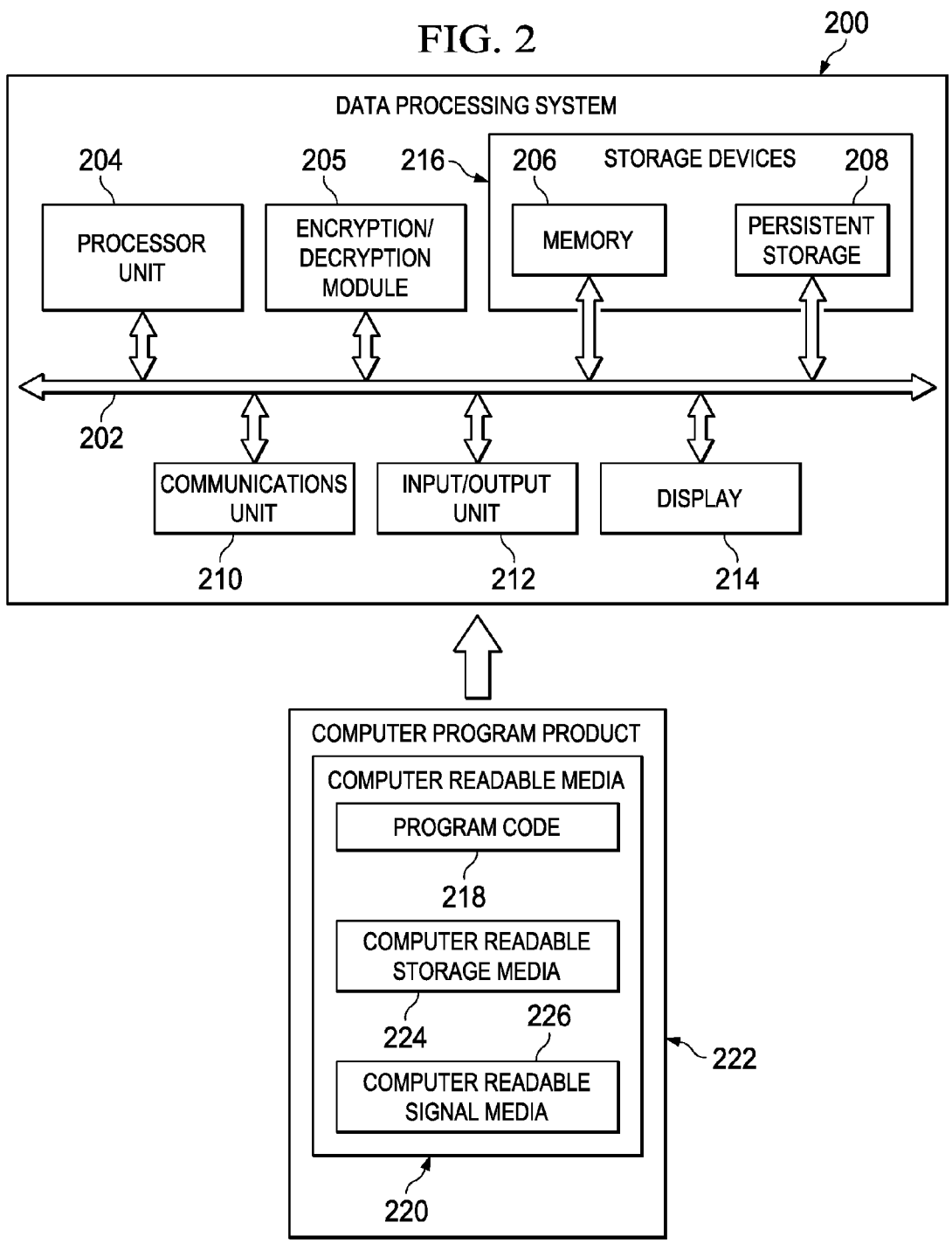
FIG. 2 is an illustration of a data processing system in accordance with an advantageous embodiment.

Turning now to FIG. 2, an illustration of a data processing system is depicted in accordance with an advantageous embodiment. Data processing system 200 is an example of a data processing system that may be used to implement a node in plurality of nodes 104 in FIG. 1. Of course, plurality of nodes 104 may have fewer or additional components, as depicted in data processing system 200.

In this illustrative example, data processing system 200 includes communications fabric 202, which provides communications between processor unit 204, encryption/decryption module 205, memory 206, persistent storage 208, communications unit 210, input/output (I/O) unit 212, and display 214.

Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. For example, a number of processors means one or more processors. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

In some advantageous embodiments, encryption and decryption of data is performed by processor unit 204. However, in some advantageous embodiments, encryption and/or decryption of data is performed by encryption/decryption module 205. Encryption/decryption module 205 is a device connected to communications fabric 202 that encrypts and/or decrypts data. Encryption/decryption module 205 may take the form of an application-specific integrated circuit (ASIC), a field programmable gate array (FPGA), an additional processor unit, or another suitable device.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Storage devices 216 may also be referred to as computer readable storage devices in these examples. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 may also be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different advantageous embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different advantageous embodiments may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208.

Computer readable storage media 224 may also take the form of a persistent storage, such as a hard drive, a thumb drive, or a flash memory, that is connected to data processing system 200. In some instances, computer readable storage media 224 may not be removable from data processing system 200. In these examples, computer readable storage media 224 is a physical or tangible storage device used to store program code 218, rather than a medium that propagates or transmits program code 218. Computer readable storage media 224 is also referred to as a computer readable tangible storage device or a computer readable physical storage device. In other words, computer readable storage media 224 is a media that can be touched by a person.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal.

In some advantageous embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different advantageous embodiments may be implemented in a data processing system, including components in addition to or in place of those illustrated for data processing system 200. Other components shown in FIG. 2 can be varied from the illustrative examples shown.

The different advantageous embodiments may be implemented using any hardware device or system capable of running program code. As one example, the data processing system may include organic components integrated with inorganic components, and/or may be comprised entirely of organic components excluding a human being. For example, a storage device may be comprised of an organic semiconductor.

In another illustrative example, processor unit 204 may take the form of a hardware unit that has circuits that are manufactured or configured for a particular use. This type of hardware may perform operations without needing program code to be loaded into a memory from a storage device to be configured to perform the operations.

For example, when processor unit 204 takes the form of a hardware unit, processor unit 204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 218 may be omitted, because the processes for the different embodiments are implemented in a hardware unit.

In still another illustrative example, processor unit 204 may be implemented using a combination of processors found in computers and hardware units. Processor unit 204 may have a number of hardware units and a number of processors that are configured to run program code 218. With this depicted example, some of the processes may be implemented in the number of hardware units, while other processes may be implemented in the number of processors.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 206, or a cache, such as found in an interface and memory controller hub that may be present in communications fabric 202.

The different advantageous embodiments recognize and take into account several different considerations. For example, the different advantageous embodiments recognize that networks may carry more traffic than the nodes in the network can process within a desired amount of time. In some advantageous embodiments, the traffic in the network is due to use of the network by a large number of computers. In other advantageous embodiments, the traffic in the network is due to one or more users attempting to prevent data from arriving at the destination for the data through the network. Of course, other reasons for the amount of traffic may be present in other advantageous embodiments.

The different advantageous embodiments also recognize and take into account that some data is considered to be a higher priority than other data in the network. For example, data for coordinating government services may be considered higher priority than delivering commercial advertisements.

Additionally, the different advantageous embodiments recognize and take into account that nodes in the network may obtain a signal that is used to identify a reference time. The reference time obtained may include an absolute time, a current time, a relative time, or synchronized time. For example, the signal may be a satellite signal, a satellite time signal, a signal transmitted from a vehicle, a wired or wireless network transmitter, or a signal received from a next node. Once the reference time for each node is set to the absolute time, current time, relative time, or synchronous time, the nodes may reserve time intervals with one another for transmitting data.

Thus, the different advantageous embodiments recognize and take into account that a first node from which data is to be transmitted may reserve a time interval with a second node directly connected to the first node during which the data may be transmitted. The first node may send a request to the second node to reserve a particular group of time intervals. The second node determines whether the particular group of time intervals is available for the second node to receive data. The second node may be unavailable to receive the data during the number of time intervals when the second node has already established another reservation for the number of time intervals.

The different advantageous embodiments recognize and take into account that the request may also contain a destination for the data desired by the first node. Prior to determining whether the number of time intervals is available at the second node, the second node may identify a third node in the network to which the data is to be transmitted for the particular destination. The second node generates a second request and transmits the second request to the third node to request a second number of time intervals. The third node repeats the process. In other words, the third node determines whether the third node is the destination for the data. When the third node is the destination for the data, the third node determines whether the number of time intervals is available and responds to the requesting node.

The different advantageous embodiments also recognize and take into account that it may be desirable to prevent an unauthorized party from identifying the destination for data traveling through the network.

When a node routes encrypted data through the network, it must either use headers that are not encrypted or headers that are encrypted. One consideration with using headers that are not encrypted with data payloads that are encrypted is that an unauthorized party might receive data being transmitted on the network and determine the types of traffic, the source, and/or destination of the traffic. The unauthorized party may also be able to determine intelligence from the patterns of traffic. However, the different advantageous embodiments also recognize and take into account that encrypting headers such that the headers are decrypted at each node to determine the source and destination of the data cause the data to be transmitted more slowly than data with unencrypted headers. Additionally, distributing encryption keys to the nodes may be costly, due to additional labor in distributing and updating the encryption keys.

In such advantageous embodiments, a number of time intervals may be reserved with a number of nodes to form a path from the source node to the destination node in the network. Once the path is formed, the source node may encrypt the data, including the headers containing destination information, such that the data is received and transmitted by each node along the path until the destination node receives the encrypted data. With the exception of the destination node, the nodes along the path do not decrypt the destination information, since the node receives the encrypted data during one reserved time interval and sends the data during another reserved time interval.

The different advantageous embodiments also recognize and take into account that an inconsistency may develop in the network. For example, a node that is along the path from the source node to the destination node may develop an inconsistency such that the node may be unable to transmit or receive data. In such advantageous embodiments, when the request for the number of time intervals is sent to a second node by a first node, the first node may also send a request for another number of time intervals to a third node. The third node is another node in the network that may transmit data to the destination node. In other words, additional paths may be formed to be used in the event an inconsistency develops in the path being used to transmit the data.

The different advantageous embodiments also recognize and take into account that the network may already be congested when a number of nodes are joined to the network. In such advantageous embodiments, each node may be configured to use a number of time intervals in sending and receiving data with particular nodes. The addresses of the particular nodes and the number of time intervals may be contained in a data source connected to the node. Alternatively, the number of time intervals and addresses may be configured by a user input. In yet other advantageous embodiments, the number of time intervals and addresses are received in messages transmitted to the nodes being joined to the network by nodes already in the network.

Thus, the different advantageous embodiments provide an apparatus and a method for managing a network. Signals are received from a plurality of time sources. A signal having a desired level of accuracy is selected from the signals. A reference time in the network is set using the signal. Data is encrypted to be transmitted through a network to form encrypted data. The encrypted data comprises a number of encrypted headers and an encrypted body. A next node in the network is identified based on a destination for the encrypted data. A request is generated to reserve a number of time intervals for transmitting the encrypted data to the next node through the network. A time interval is a time between transmission of the encrypted data in the network using the reference time. The encrypted data is transmitted in the network during the number of time intervals responsive to receiving an approval for the request from the next node.

Figure 3:
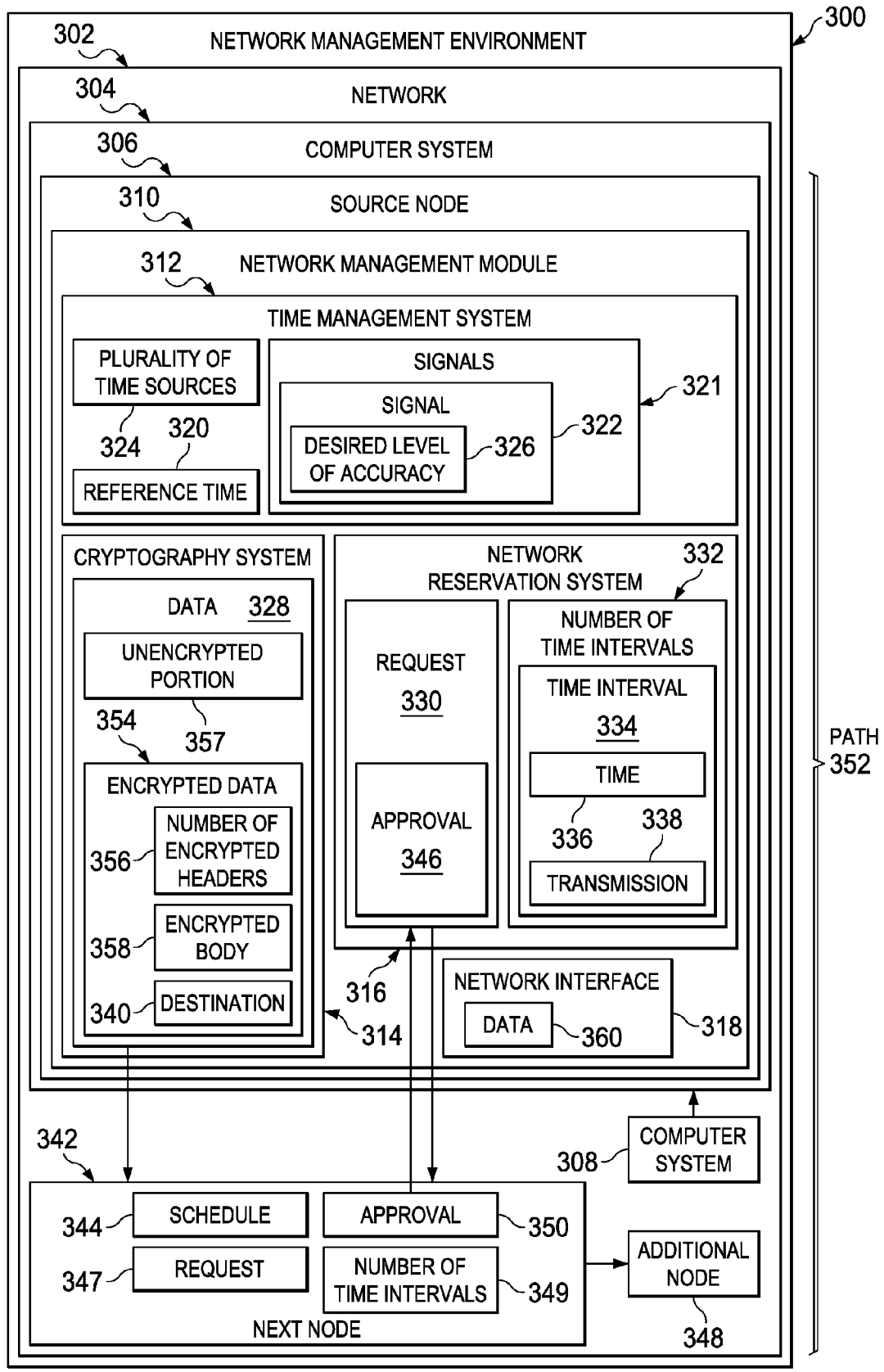
FIG. 3 is an illustration of a network management environment in accordance with an advantageous embodiment.

Turning now to FIG. 3, an illustration of a network management environment is depicted in accordance with an advantageous embodiment. Network management environment 300 is an environment in which advantageous embodiments may be implemented. Network 302 is in network management environment 300 and is an example implementation of network 102 in FIG. 1.

Computer system 304 is connected to network 302 in these illustrative examples. For example, computer system 304 may have an Ethernet connection to network 302. In this advantageous embodiment, computer system 304 may be source node 306. Source node 306 is a node in network 302 that receives data to send through network 302 from computer system 308 or generates data to send through network 302. Computer system 308 may be implemented using a number of data processing systems. The number of data processing systems in computer system 308 may be implemented using data processing system 200 in FIG. 2, which generates data to send through network 302. Computer system 308 is connected to source node 306 in network 302, but not to other nodes in this illustrative example.

Network management module 310 is located in computer system 304. Network management module 310 may be implemented using hardware, software, or a combination of the two. In this advantageous embodiment, network management module 310 is a process running on computer system 304. In these illustrative examples, network management module 310 includes time management system 312, cryptography system 314, network reservation system 316, and network interface 318. Time management system 312 is configured to set reference time 320 of source node 306. In these illustrative examples, reference time 320 received may include an absolute time, a relative time, or a synchronized time. An absolute time is the time in the physical world. For example, 5:03:24.123 PM on Feb. 1, 2011 AD is an absolute time. Of course, the level of precision in the absolute time may vary in the different advantageous embodiments. A current time may be the local time, which may be agreed upon between nodes. A relative time is a time established with respect to a common reference time. For example, if two nodes establish a common reference time, and then each node counts 100 microseconds, each node has established a relative time of 100 microseconds relative to the common reference time. A synchronized time is a time at which nodes agree upon a reference time common to the nodes.

A plurality of nodes may each begin incrementing units of time once the common reference time is established. For example, source node 306 may begin counting the number of hundredths of a second that have elapsed since the moment plurality of time signals 106 in FIG. 1 is established. Of course, source node 306 may identify a different size portion of a second in different advantageous embodiments. For example, source node 306 may identify thousandths of a second. In these illustrative examples, time management system 312 uses signal 322 to set reference time 320.

More specifically, time management system 312 receives signals 321 from plurality of time sources 324. Signal 322 in signals 321 is a wired or wireless communication that includes an indication of the reference time. For example, signal 322 may be a global positioning system (GPS) signal when plurality of time sources 324 includes a number of global positioning system satellites. In other advantageous embodiments, time management system 312 does not receive signals 321. Instead, time management system 312 is a circuit that receives time data.

Plurality of time sources 324 may include time sources with different levels of accuracy. For example, plurality of time sources 324 may include a signal from a wired or wireless network transmitter, another node, and/or a signal from an atomic clock. In such an advantageous embodiment, time management system 312 identifies signal 322 from signals 321 with desired level of accuracy 326. Desired level of accuracy 326 is the amount of specificity of signal 322 with respect to the time.

Time management system 312 is configured to set reference time 320 for source node 306 using signal 322 having desired level of accuracy 326. In the event that signal 322 from multiple time sources exceeds desired level of accuracy 326, time management system 312 may set reference time 320 using signal 322 with the highest accuracy of plurality of time sources 324 available.

Source node 306 is a hardware device that is configured to receive data 328 from computer system 308. Source node 306 may also include software and may be implemented using data processing system 200 in FIG. 2.

In this example, data 328 includes destination 340. Destination 340 is an indication of a node for which data 328 is intended. In these illustrative examples, destination 340 is an address on network 302. Alternatively, source node 306 may generate data 328 to be sent using source node 306.

Network reservation system 316 is configured to identify next node 342 in network 302. Next node 342 is the node in network 302 which is to receive data 328 with a destination of destination 340. Network reservation system 316 may use a routing table or another suitable information source in order to identify next node 342 using the address of destination 340.

Network reservation system 316 then generates request 330. This request is generated in response to identifying next node 342. Request 330 is a message that includes desired values for number of time intervals 332. Time interval 334 is time 336 that occurs between transmission 338 of data 328 or one or more portions of data 328. For example, time interval 334 may be about five nanoseconds. In other advantageous embodiments, however, time interval 334 changes between each interval. For example, time interval 334 may be generated based on a key or value known to source node 306 and next node 342.

Network reservation system 316 then uses network interface 318 to send request 330 to next node 342. Request 330 is received by next node 342. Next node 342 identifies number of time intervals 332 indicated in request 330. Next node 342 then determines whether next node 342 is available during number of time intervals 332. In these examples, next node 342 uses schedule 344 to determine whether next node 342 is available during number of time intervals 332 by determining whether another reservation is already stored in schedule 344 for number of time intervals 332.

In the event that next node 342 is unavailable during number of time intervals 332, next node 342 may transmit a rejection of request 330 to source node 306. In other advantageous embodiments, next node 342 may send a message to source node 306 that includes alternative values for number of time intervals 332. In these illustrative examples, next node 342 is available during number of time intervals 332.

Next node 342 then determines whether next node 342 is destination 340. In the event that next node 342 is destination 340, next node 342 transmits approval 346 to source node 306. In the event that next node 342 is not destination 340, next node 342 identifies additional node 348. Next node 342 then generates request 347 to send data 328 during number of time intervals 349 and sends request 347 to additional node 348. Number of time intervals 349 includes different time intervals than number of time intervals 332 in these illustrative examples. However, in other illustrative examples, number of time intervals 349 includes the same time intervals as number of time intervals 332.

Additional node 348 is a node that is connected to next node 342 in network 302. Additional node 348 may be directly connected to next node 342 or connected through a number of other channels. For example, additional node 348 may be connected to next node 342 using two links connected by a device that bridges the two links. Additional node 348 may or may not also be connected to source node 306. Additional node 348 is the node which next node 342 identifies as being the node to which data 328 with destination 340 is sent in network 302. Additional node 348 may send approval 350 to next node 342 if additional node 348 is destination 340.

When next node 342 receives approval 350 from additional node 348, next node 342 generates approval 346 and sends approval 346 to source node 306. Additional node 348 may generate another request and send the request to another node identified as the next node to receive data 328 with destination 340 for additional node 348. Next node 342 modifies schedule 344 to indicate that data received from source node 306 during number of time intervals 332 is to be sent to additional node 348.

In this illustrative example, approval 346 is received by source node 306. Thus, path 352 is formed. Path 352 is the route that data 328 is to take through network 302 while being transmitted during number of time intervals 332 and/or number of time intervals 349. In this advantageous embodiment, path 352 includes source node 306, next node 342, additional node 348, and other nodes in the network that approve requests to transmit data 328.

Cryptography system 314 is configured to encrypt data 328 to form encrypted data 354. In these illustrative examples, data 328 is in the form of a number of data packets having a number of headers and a body. Encrypted data 354 includes encrypted headers 356 and encrypted body 358. Encrypted headers 356 include information about destination 340. Thus, destination 340 may not be observed by observing encrypted data 354. The encryption of the entire packet is also referred to as full encryption or full packet encryption. In this advantageous embodiment, encrypted data 354 is encrypted such that no portion of data 328 is in unencrypted form. Thus, encrypted data 354 does not include unencrypted portion 357 of data 328. However, in other advantageous embodiments, portions of data 328 may be unencrypted. For example, the number of headers for data 328 may be encrypted, but the body portion of data 328 may be unencrypted.

Cryptography system 314 causes network interface 318 to transmit encrypted data 354 through network 302 using path 352. For example, network interface 318 transmits encrypted data 354 from source node 306 to next node 342 during number of time intervals 332. Next node 342 receives encrypted data 354 during number of time intervals 332. Next node 342 uses schedule 344 to identify that data received from source node 306 during number of time intervals 332 is to be transmitted to additional node 348 during number of time intervals 349. Next node 342 does not decrypt encrypted data 354. More specifically, next node 342 transmits encrypted data 354 without decrypting encrypted headers 356. Encrypted data 354 is transmitted along path 352 of nodes such that encrypted data 354 arrives at destination 340.

The illustration of network management environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, data 328 is not encrypted by cryptography system 314 prior to transmission 338 during number of time intervals 332. In such an advantageous embodiment, next node 342 still identifies that additional node 348 is to receive data 328 without using the headers or destination information in data 328.

In another illustrative example, time management system 312 is configured to receive signal 322 from plurality of time sources 324 based on a priority list of time sources. The list may be prioritized based on accuracy, availability, or other suitable factors.

Additionally, in some advantageous embodiments, network interface 318 transmits data 360 when number of time intervals 332 occurs and data 328 and/or encrypted data 354 have not been received for transmission. In other words, data 360 is other data that is transmitted during number of time intervals 332 when data 328 and/or encrypted data 354 are unavailable to be transmitted.

Figure 4:
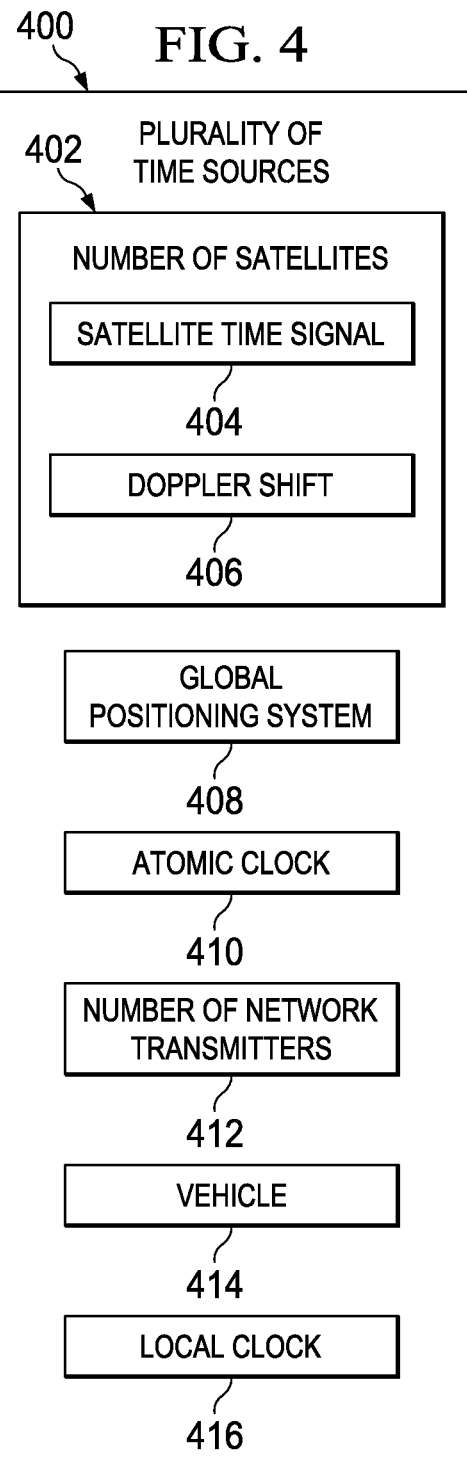
FIG. 4 is an illustration of a plurality of time sources in accordance with an advantageous embodiment.

Turning now to FIG. 4, an illustration of a plurality of time sources is depicted in accordance with an advantageous embodiment. Plurality of time sources 400 is an example of one implementation of plurality of time sources 324 in FIG. 3.

Plurality of time sources 400 includes different time sources in the different advantageous embodiments. For example, plurality of time sources 400 may include number of satellites 402 that generates satellite time signal 404. Number of satellites 402 is a collection of satellites that broadcast satellite time signal 404 and travel in an orbit known to a time management system, such as time management system 312 in FIG. 3, or another suitable component. In some advantageous embodiments, number of satellites 402 may be traveling at a speed and in an orbit such that Doppler shift 406 may be identified.

Doppler shift 406 is the change in frequency of a wave for an observer moving relative to the source of the wave. Doppler shift 406 of satellite time signal 404 is used to increase the accuracy of satellite time signal 404 over receiving the time from satellite time signal 404 without Doppler shift 406. Thus, accuracy of number of satellites 402 is increased when number of satellites 402 is traveling at a speed and in an orbit such that Doppler shift 406 may be identified.

Plurality of time sources 400 may also include global positioning system 408, atomic clock 410, number of network transmitters 412, vehicle 414, and/or local clock 416. Number of network transmitters 412 includes wireless network transmitters, such as cell phone networks, wireless data networks, a wireless transmitter located in an aerial vehicle, and other suitable wireless transmitters. Number of network transmitters 412 also includes wired network transmitters in some advantageous embodiments. For example, number of network transmitters 412 may include another node in the network. Local clock 416 is a time device that is a component of a time management system.

In some advantageous embodiments, atomic clock 410 and/or another time source is located aboard vehicle 414 traveling within wireless communication distance of one or more nodes. In such an advantageous embodiment, a signal containing the time information from atomic clock 410 may be transmitted to the one or more nodes from the vehicle. Vehicle 414 may be an aerial vehicle, a land-based vehicle, a space-based vehicle, or another suitable type of vehicle. Of course, vehicle 414 may have a different source of time than atomic clock 410, such as time data received from global positioning system 408. Vehicle 414 may retransmit the time data from global positioning system 408.

Figure 5:
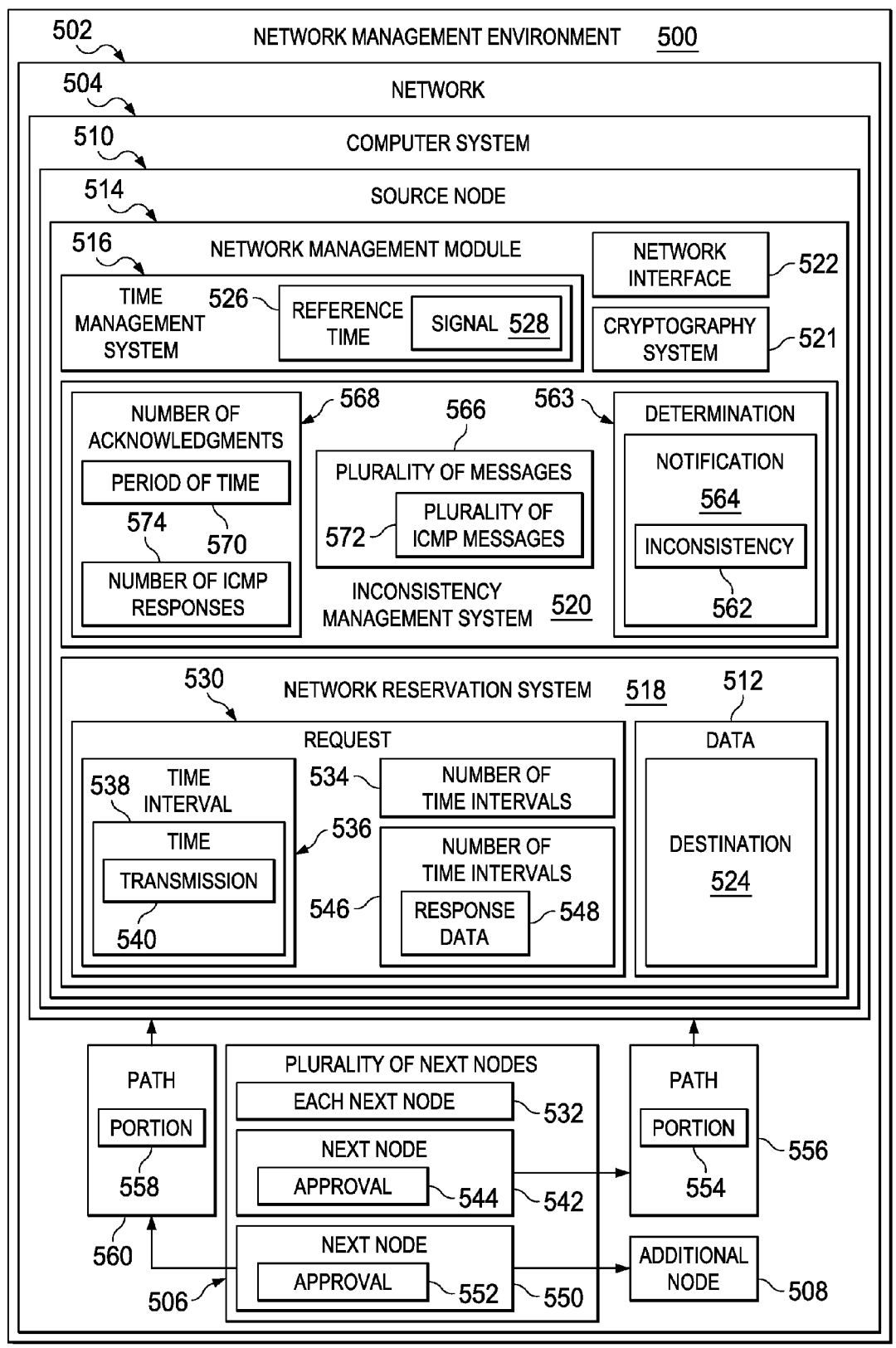
FIG. 5 is an illustration of a network management environment that implements backup paths in accordance with an advantageous embodiment.

Turning now to FIG. 5, an illustration of a network management environment that implements backup paths is depicted in accordance with an advantageous embodiment. Network management environment 500 is similar to network management environment 300 and implements some or all of the features of network management environment 300 in FIG. 3. Network management environment 500 also implements additional and/or different features with respect to backup paths. The backup paths in network management environment 500 are an example implementation of backup paths 116 in FIG. 1.

Network management environment 500 contains network 502. Network 502 is a collection of computers connected such that data can be transmitted and received among the computers using the connections in network 502. Network 502 contains computer system 504, plurality of next nodes 506, and additional node 508 in this advantageous embodiment. Of course, additional or fewer nodes may be present in other advantageous embodiments.

Computer system 504 is source node 510 in these illustrative examples. Computer system 504 may be an example implementation of data processing system 200 in FIG. 2. However, in other advantageous embodiments, computer system 504 may be in the form of a router or other suitable device. Source node 510 is a node in network 502 that is the first node to send data 512 to another node using network 502.

Computer system 504 runs network management module 514. Network management module 514 contains time management system 516, network reservation system 518, inconsistency management system 520, cryptography system 521, and network interface 522. In this illustrative example, computer system 504 receives data 512 to transmit to destination 524. Destination 524 is an indication of a node on network 502. In these illustrative examples, destination 524 includes the address on network 502 of the node to which data 512 is to be sent.

Time management system 516 performs similar functions to time management system 312 in FIG. 3. However, time management system 516 may perform additional functions in some advantageous embodiments. In these illustrative examples, time management system 516 sets reference time 526 for source node 510 using signal 528. Reference time 526 is similar to reference time 320 in FIG. 3, such that reference time 526 may include an absolute time, a current time, a relative time, a synchronized time, and/or another suitable type of time. Time management system 516 receives the time from a time source, such as plurality of time sources 400 in FIG. 4. Time management system 516 then sets reference time 526 to the time received in signal 528.

Source node 510 then waits to receive data 512 for transmission through network 502. Data 512 may be received from another computer system, such as computer system 308 in FIG. 3. Data 512 includes destination 524. When data 512 is received, network reservation system 518 performs functions similar to network reservation system 316 in FIG. 3. Network reservation system 518 also performs additional functions.

In these illustrative examples, network reservation system 518 identifies destination 524 in data 512 and identifies plurality of next nodes 506. Plurality of next nodes 506 is a collection of nodes in network 502 that are known to source node 510 to be able to communicate with destination 524. Each of plurality of next nodes 506 may be directly connected to destination 524 or indirectly connected to destination 524. "Directly connected" means that the node shares a link with destination 524. "Indirectly connected" means that the node in plurality of next nodes 506 is not directly connected to destination 524, but can communicate with destination 524 through other nodes.

The quantity of nodes in plurality of next nodes 506 may be set by a rule. The rule may set the quantity of nodes in different ways. For example, the quantity of nodes in plurality of next nodes 506 may be limited to a maximum quantity of nodes, set to all nodes that are directly or indirectly connected to destination 524, or another suitable rule. Once plurality of next nodes 506 is identified, network reservation system 518 generates request 530 to transmit data 512 to each next node 532 in plurality of next nodes 506 during number of time intervals 534. Time interval 536 in number of time intervals 534 is time 538 between transmission 540 of data 512 or one or more portions of data 512. Request 530 is transmitted using network interface 522.

Request 530 is received at each next node 532. Each next node 532 determines whether number of time intervals 534 is available at the particular next node. For example, next node 542 uses a schedule, such as schedule 344 in FIG. 3, to determine whether number of time intervals 534 is available for receiving data 512 from source node 510. Each next node 532 then identifies destination 524 contained in request 530.

In the event that the particular node is not destination 524, the node identifies the node to which data 512 with destination 524 is to be sent. In this advantageous embodiment, next node 542 identifies additional node 508. Additional node 508 is the node to which data 512 is to be transmitted from next node 542 when data 512 has destination 524.

In some advantageous embodiments, network reservation system 518 also generates request 530 such that request 530 includes number of time intervals 546. Number of time intervals 546 is a time interval between the reception of response data 548 by source node 510. Response data 548 is information about plurality of next nodes 506 and/or network 502. For example, response data 548 may include an acknowledgement that data 512 is received at next node 542 and/or additional node 508.

In this illustrative example, source node 510 sends request 530 to next node 542 and next node 550. Source node 510 then receives approval 544 from next node 542 and approval 552 from next node 550. Thus, source node 510, next node 542, and additional node 508 form portion 554 of path 556. Likewise, source node 510 and next node 550 form portion 558 of path 560. In some advantageous embodiments, path 556 has a higher priority than path 560. In such advantageous embodiments, path 556 is referred to as a primary path, and path 560 is referred to as a backup path. Additional backup paths may also be formed. Path 560 and other backup paths are an example implementation of backup paths 116 in FIG. 1.

Each next node 532 may then send an approval, such as approval 350 in FIG. 3, to source node 510. In this illustrative example, next node 542 sends approval 544 to source node 510 as described with respect to next node 342 using schedule 344 in FIG. 3. Additional nodes in plurality of next nodes 506 may send an approval to source node 510 in different advantageous embodiments.

Once approval 544 is received from next node 542, source node 510 transmits data 512 to next node 542 during number of time intervals 534. Likewise, source node 510 transmits data 512 to each next node 532 that may send an approval to source node 510 to transmit data 512 during number of time intervals 534.

Data 512 is thus transmitted to destination 524 using path 556. In some advantageous embodiments, data 512 is encrypted using cryptography system 521 prior to being transmitted by source node 510. Cryptography system 521 is an example of an implementation of cryptography system 314 in FIG. 3.

However, inconsistency 562 may develop in next node 542, additional node 508, or at another location or link in network 502. The term "inconsistency", as used herein, is a fault and/or interruption in a network that prevents communication in the network or a portion of the network. For example, a loss of electrical power to a node in a network may cause the node to be unable to communicate. Such a node has developed an inconsistency.

In the event that inconsistency 562 develops, one or more nodes along path 556 may make determination 563. Determination 563 is a conclusion that inconsistency 562 has developed in next node 542, additional node 508, or at another location or link in network 502. In some advantageous embodiments, determination 563 is reached by one or more nodes along path 556 generating notification 564. Notification 564 is a message that includes information related to inconsistency 562. In some advantageous embodiments, notification 564 is received during number of time intervals 546 as response data 548. For example, notification 564 may include an identity of nodes in network 502 that may not transmit or receive data 512.

Notification 564 is received by inconsistency management system 520 at source node 510. Inconsistency management system 520 then causes network interface 522 to cease transmitting data 512 using path 556 and to transmit data 512 using path 560.

In other advantageous embodiments, notification 564 is not received. Instead, determination 563 is obtained by source node 510 sending plurality of messages 566 to next node 542 for path 556 and next node 550 for path 560. In some advantageous embodiments, next node 542 and next node 550 retransmit plurality of messages 566 to the next node on path 556 and path 560, respectively. Plurality of messages 566 may be transmitted on a periodic or non-periodic basis. Plurality of messages 566 is requests for acknowledgment by the other nodes on the particular path.

Next node 542 and next node 550 send number of acknowledgments 568 to source node 510 to indicate that plurality of messages 566 has been received and next node 542 and/or next node 550 are operating normally. In some advantageous embodiments, source node 510 may also receive number of acknowledgments 568 from other nodes along path 556 and/or path 560.

When inconsistency 562 develops for a node on path 556 such that the node may not transmit and/or receive data 512, the node does not send number of acknowledgments 568. Once source node 510 does not receive number of acknowledgments 568 for at least period of time 570, inconsistency management system 520 makes determination 563 that inconsistency 562 has occurred along path 556. Inconsistency management system 520 then causes network interface 522 to cease transmitting data 512 using path 556 and to transmit data 512 using path 560.

In these illustrative examples, plurality of messages 566 may be plurality of Internet Control Message Protocol (ICMP) messages 572. Likewise, number of acknowledgments 568 may be number of Internet Control Message Protocol (ICMP) responses 574. Of course, plurality of Internet Control Message Protocol (ICMP) messages 572 and/or number of Internet Control Message Protocol (ICMP) responses 574 may be in the form of other suitable transmissions. Plurality of messages 566 may be transmitted on an application layer, a session layer, a link layer, or a network layer of a transmission control protocol/Internet protocol (TCP/IP) network. Likewise, number of acknowledgments 568 may be received by source node 510 on an application layer, a session layer, a link layer, or a network layer of a transmission control protocol/Internet protocol (TCP/IP) network.

The illustration of network management environment 500 in FIG. 5 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, data 512 may be received from a computer system connected to source node 510. In such an illustrative example, data 512 may be received using a network interface, a universal serial bus (USB) interface, or another suitable interface.

For example, in some advantageous embodiments, source node 510 also contains cryptography system 521, such as cryptography system 314 in FIG. 3. In such advantageous embodiments, source node 510 may use cryptography system 521 to encrypt data 512 to form encrypted data. Cryptography system 521 may encrypt both the headers and the body of data 512 to form the encrypted data such that no portion of data 512 is unencrypted in the encrypted data.

Figure 6:
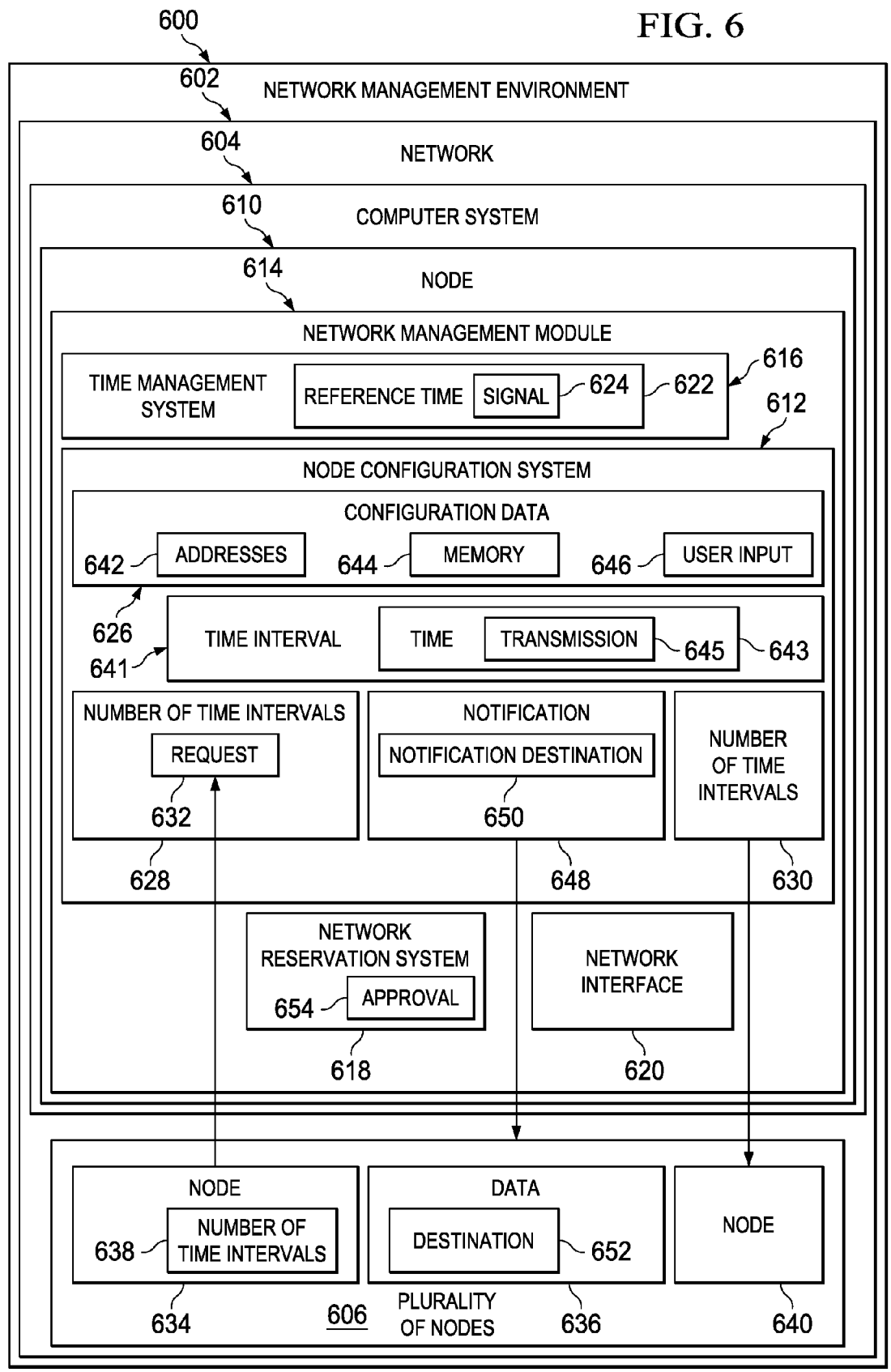
FIG. 6 is an illustration of a network management environment in which pre-reserved paths are implemented in accordance with an advantageous embodiment.

Turning now to FIG. 6, an illustration of a network management environment in which pre-reserved paths are implemented is depicted in accordance with an advantageous embodiment. Network management environment 600 is an alternative implementation of network management environment 300 in FIG. 3. Network management environment 600 includes network 602. Network 602 is a collection of computers connected such that data can be transmitted and received among the computers using the connections in network 602. Network 602 contains computer system 604 and plurality of nodes 606 in this advantageous embodiment. Of course, additional or fewer nodes may be present in other advantageous embodiments.

Computer system 604 is node 610 in these illustrative examples. Computer system 604 may be an example implementation of data processing system 200 in FIG. 2. However, in other advantageous embodiments, computer system 604 may be in the form of a router, switch, or other suitable device. Node 610 is a device being added to network 602. For example, node 610 may be starting from an offline state.

Computer system 604 runs network management module 614. Network management module 614 contains time management system 616, node configuration system 612, network reservation system 618, and network interface 620. Time management system 616 sets reference time 622 for node 610 using signal 624. Time management system 616 performs the same or similar functions as time management system 516 in FIG. 5. Likewise, signal 624 is an example of one implementation of signal 322 in FIG. 3. In some advantageous embodiments, however, reference time 622 may be received from one or more nodes in plurality of nodes 606 instead of signal 624. Reference time 622 is similar to reference time 320 in FIG. 3, such that reference time 622 may include an absolute time, a current time, a relative time, a synchronized time, and/or another suitable type of time.

When node 610 is added to network 602, node configuration system 612 identifies configuration data 626. Configuration data 626 is information about number of time intervals 628 and/or number of time intervals 630. Number of time intervals 628 is a time between receiving at least a portion of request 632. Time interval 641 in number of time intervals 628 and/or number of time intervals 630 is time 643 between transmission 645 of data 636 or one or more portions of data 636. Request 632 is a message from node 634 to node 610 to determine whether node 610 is available for receiving data 636 during number of time intervals 638. Number of time intervals 630 is a time between transmitting data to another node in plurality of nodes 606, such as node 640.

Configuration data 626 may also include addresses 642. Addresses 642 are indications of which nodes in network 602 are directly connected to node 610. In this illustrative example, plurality of nodes 606 is the collection of nodes that are directly connected to node 610. Configuration data 626 may be stored in memory 644. Alternatively, configuration data 626 may be received in user input 646.

In yet other advantageous embodiments, node configuration system 612 generates notification 648. Notification 648 is an indication to plurality of nodes 606 that node 610 is now available. Notification 648 is transmitted to plurality of nodes 606 using network interface 620 during number of time intervals 630. In such advantageous embodiments, at least a portion of configuration data 626 is transmitted from plurality of nodes 606 to node 610 during number of time intervals 628.

Notification 648 may also be encrypted prior to being transmitted to plurality of nodes 606 using a cryptography system, such as cryptography system 314 in FIG. 3. Since notification 648 is transmitted during number of time intervals 630, notification 648 is not decrypted until notification 648 arrives at notification destination 650. Thus, an unauthorized party that receives notification 648 may not identify notification destination 650.

In this illustrative example, node 634 receives data 636 with destination 652 of node 640. Node 610 is directly connected to node 634 and node 640. Additionally, node 610 has approved node 634 to send request 632 to node 610 during number of time intervals 628. Node 640 has also approved node 610 to send requests for additional time intervals during number of time intervals 630. Thus, node 634 sends request 632 to node 610 during number of time intervals 628. Request 632 includes desired time intervals for sending data 636 to node 610. For example, request 632 includes number of time intervals 638. Node 610 uses network reservation system 618 to identify destination 652 as node 640. Network reservation system 618 then generates approval 654 and sends approval 654 to node 634. Network reservation system 618 performs the same or similar functions of network reservation system 316 in FIG. 3.

Node 634 sends data 636 to node 610 during number of time intervals 638. Node 610 receives data 636 and sends data 636 to node 640 during number of time intervals 630. In these examples, node 610 does not identify destination 652 using information in data 636.

Figure 7:
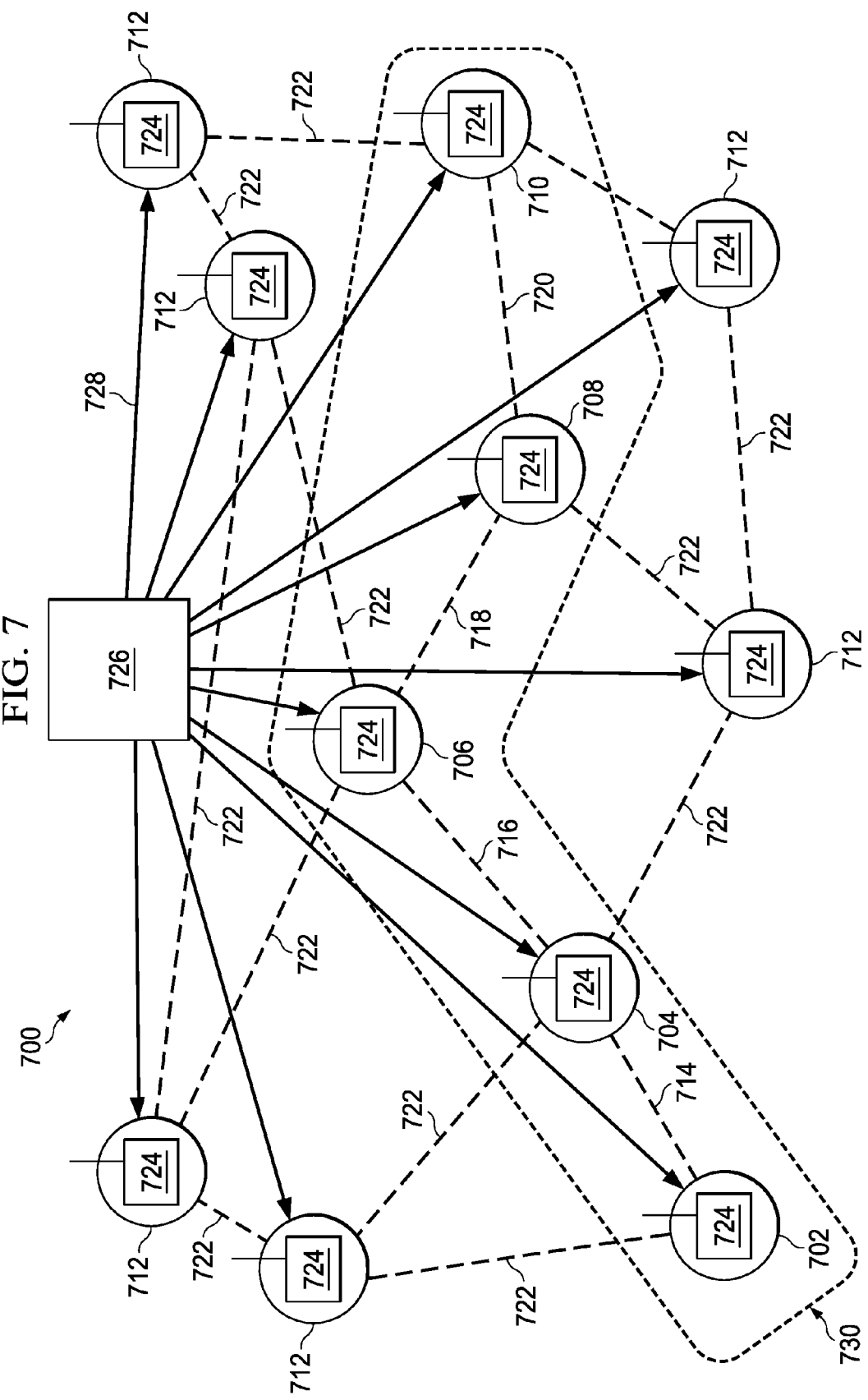
FIG. 7 is an illustration of a network implementing full encryption in accordance with an advantageous embodiment.

Turning now to FIG. 7, an illustration of a network implementing full encryption is depicted in accordance with an advantageous embodiment. Network 700 is an example of one implementation of network 302 in FIG. 3. Full packet encryption in network 700 is an example implementation of full encryption 114 in FIG. 1.

Network 700 contains nodes 702, 704, 706, 708, 710, and 712. The collection of nodes 702, 704, 706, 708, 710, and 712 is an example implementation of plurality of nodes 104 in FIG. 1. Network 700 also contains links 714, 716, 718, 720, and 722. Links 714, 716, 718, 720, and 722 are communication channels between the node on each side of the respective link. For example, link 714 connects node 702 and node 704 such that node 702 may transmit data to node 704 and receive data from node 704.

In this advantageous embodiment, nodes 702, 704, 706, 708, 710, and 712 each have time management system 724. Time management system 724 is a device that sets a reference time for each of nodes 702, 704, 706, 708, 710, and 712 to the time received from time source 726. While time source 726 is depicted as a single time source in this advantageous embodiment, time source 726 may also include a plurality of time sources, such as plurality of time sources 400 in FIG. 4. The time is received at each of nodes 702, 704, 706, 708, 710, and 712 from time source 726. Time source 726 is a device that stores the reference time. In advantageous embodiments in which time source 726 includes a plurality of time sources, each time source is a device that obtains and/or stores the reference time. For example, time management system 724 may include a global positioning system receiver, and time source 726 may be a number of global positioning system satellites. Time management system 724 is an example implementation of time management system 312 in FIG. 3.

Time management system 724 receives signal 728 from time source 726. In some advantageous embodiments, time management system 724 also receives additional signals from other time sources. In this illustrative example, signal 728 is a satellite time signal.

Assume node 702 then receives data to be transmitted to node 710. Node 702 may receive the data from a computer connected to node 710 or generate the data to be transmitted to node 710.

Node 702 identifies that node 704 is a node to which data with a destination of node 710 is to be sent by node 702. Node 702 may identify node 704 using a routing table or another suitable information store. Node 702 generates a first request to send data during a first number of time intervals and sends the first request to node 704. The request includes the destination for the data to be transmitted. In this illustrative example, the request contains the address of node 710.

Node 704 receives the request and identifies that the destination is node 710. Node 704 then identifies the node to which data with a destination of 710 is to be sent. Node 704 identifies node 706 in this illustrative example. Of course, in other illustrative examples, node 704 may identify a different node based on a preference for a particular node or against a particular node. The preference may be set by an administrator, for example. Node 704 sends a request to node 706 to send data during a number of time intervals.

Node 706 receives the request from node 704 and likewise identifies that the destination is node 710. Node 706 then identifies node 708 as the node to which data with a destination of node 710 is to be sent. Node 706 sends a request to send data during a number of time intervals to node 708. Likewise, node 708 identifies node 710 and sends a request to node 710.

Node 710 receives the request from node 708 and identifies that node 710 is the destination for the data. Node 710 determines whether the number of time intervals is available for node 710 to receive data. The number of time intervals is available when the number of time intervals is not already reserved in another reservation and/or by another node.

In this illustrative example, node 710 is available to receive data during the number of time intervals. Nodes 702, 704, 706, 708, and 710 may store a schedule of time intervals to identify where data received during particular time intervals is to be sent. Thus, node 710 sends an approval to node 708.

Node 708 receives the approval and sends an approval to node 706. Node 706 receives the approval and sends an approval to node 704. Node 704 receives the approval and sends an approval to node 702. Node 702 receives the approval. Nodes 702, 704, 706, 708, and 710 now form path 730 through network 700.

Once path 730 through network 700 is formed, node 702 encrypts the data to be transmitted. The destination information is also encrypted such that only node 710 from network 700 may decrypt the data and the destination information. Node 702 transmits the data during the number of time intervals to node 704.

Node 704 receives the data during the number of time intervals. Of course, in some advantageous embodiments, a tolerance is added to the number of time intervals based on the amount of time taken for data to travel over link 714. Node 704 identifies that data received during the number of time intervals is to be transmitted to node 706, according to the reservation in the schedule for node 704. Node 704 transmits the data to node 706 without decrypting the data or the destination information using the schedule.

Likewise, node 706 receives the data during the number of time intervals and transmits the data to node 708 during the number of time intervals. Node 708 receives the data during the number of time intervals and transmits the data to node 710 during the number of time intervals. Thus, the data arrives at the destination for the data. Node 710 uses a decryption key or other suitable decryption device to decrypt the data. In these examples, the data is decrypted into the same form as the data prior to the encryption by node 702. In other words, the decrypted data contains destination header information.

The illustration of network 700 in FIG. 7 is not meant to imply physical or architectural limitations to the manner in which different advantageous embodiments may be implemented. Other components in addition to and/or in place of the ones illustrated may be used. Some components may be unnecessary in some advantageous embodiments.

For example, in these illustrative examples, the number of time intervals is shared among nodes 702, 704, 706, 708, and 710 along path 730 through network 700. However, in other illustrative examples, the number of time intervals requested in the request from one node to another may be different with respect to other nodes in path 730.

In FIG. 8, an illustration of data is depicted in accordance with an advantageous embodiment. Data 800 is an example of one implementation of data 328 in FIG. 3.

As illustrated, data 800 is an Internet Protocol (IP) packet in these examples. Data 800 includes flags 802, layer 2 headers 804, layer 3 headers 806, additional headers 808, payload 810, cyclic redundancy check values 812, and flags 814. Additional headers 808 and flags 802 and 814 include information about data 800, such as the length or size of data 800. Layer 2 headers 804 include information about the node that most recently transmitted data 800 and the node to which data 800 is being sent.

Layer 3 headers 806 include the source node that first transmitted data 800 and the destination for data 800. The destination for data 800 in layer 3 headers 806 is an example of destination 340 in FIG. 3. Payload 810 is the information that is intended to be received by the destination. For example, payload 810 may include a portion of an electronic mail. Cyclic redundancy check values 812 are a collection of numbers that indicate whether data 800 contains any inconsistencies.

Turning now to FIG. 9, an illustration of encrypted data is depicted in accordance with an advantageous embodiment. Encrypted data 900 is an example implementation of encrypted data 354 in FIG. 3. Encrypted data 900 also includes flags 802, layer 2 headers 804, layer 3 headers 806, additional headers 808, payload 810, cyclic redundancy check values 812, and flags 814. However, flags 802, layer 2 headers 804, layer 3 headers 806, additional headers 808, payload 810, cyclic redundancy check values 812, and flags 814 are encrypted in these examples. Once encrypted, the collection of layer 2 headers 804 and layer 3 headers 806 is an example implementation of encrypted headers 356 in FIG. 3. Once encrypted, payload 810 is an example implementation of encrypted body 358 in FIG. 3.

Encrypted data 900 may be encrypted by a cryptography system, such as cryptography system 314 in FIG. 3, using Data Encryption Standard (DES), Advanced Encryption Standard (AES), Twofish, Blowfish, or other suitable encryption systems. Encrypted data 900 may be transmitted through paths in a network without nodes decrypting any of encrypted data 900.

With reference now to FIG. 10, an alternative illustration of encrypted data is depicted in accordance with an advantageous embodiment. Encrypted data 1000 contains flags 802, additional headers 808, payload 810, cyclic redundancy check values 812, and flags 814, as in encrypted data 900. However, prior to being encrypted, layer 2 headers 804 and layer 3 headers 806 were removed from encrypted data 900. Since encrypted data 1000 is transmitted during reserved time intervals, nodes transmitting and receiving encrypted data 1000 are aware of the next node to receive encrypted data 1000 without layer 2 headers 804 and layer 3 headers 806 as in FIG. 8 and FIG. 9.

Figure 11:
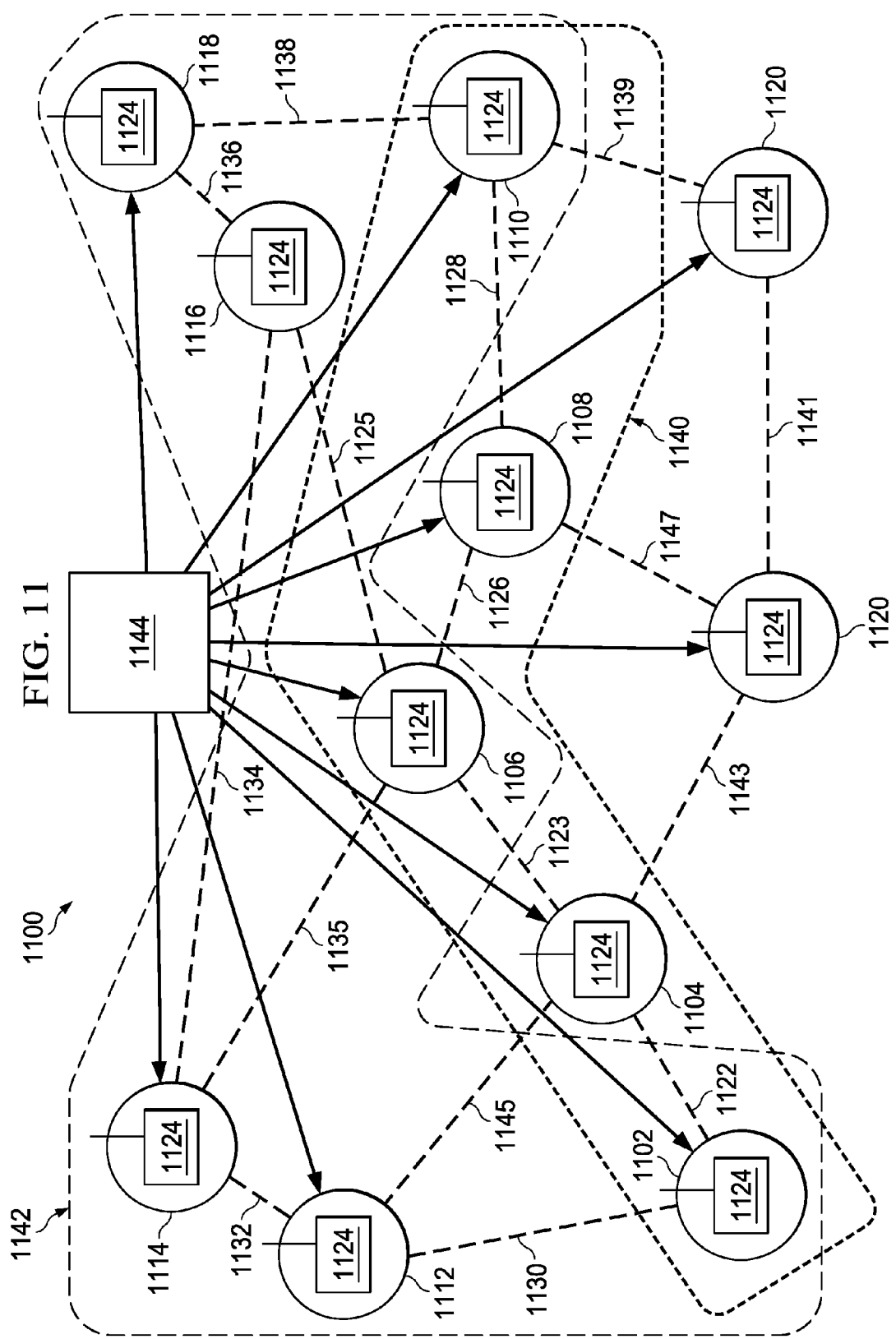
FIG. 11 is an illustration of a network in which backup paths are implemented in accordance with an advantageous embodiment.

With reference now to FIG. 11, an illustration of a network in which backup paths are implemented is depicted in accordance with an advantageous embodiment. Network 1100 is an example of another implementation of network 302 in FIG. 3. As depicted, network 1100 is similar to network 700 in that network 1100 contains the same nodes as network 700. However, network 1100 includes different and/or additional features than network 700. Network 1100 is an example implementation of network 502 in FIG. 5.

Network 1100 includes nodes 1102, 1104, 1106, 1108, 1110, 1112, 1114, 1116, 1118, and 1120. Network 1100 also includes links 1122, 1123, 1125, 1126, 1128, 1130, 1132, 1134, 1135, 1136, 1138, 1139, 1141, 1143, 1145, and 1147. Links 1122, 1123, 1125, 1126, 1128, 1130, 1132, 1134, 1135, 1136, 1138, 1139, 1141, 1143, 1145, and 1147 connect pairs of nodes in network 1100. For example, link 1122 connects node 1102 and 1104. Each node also has time management system 1124. Time management system 1124 sets the reference time for each node using time source 1144. Time source 1144 may include a plurality of time sources, such as plurality of time sources 400 in FIG. 4. Time management system 1124 is an example implementation of time management system 312 in FIG. 3.

In this illustrative example, node 1102 receives data with a destination of node 1110. Network 102 implements backup paths, as described with respect to backup paths 116 in FIG. 1. The data is an example implementation of data 512 in FIG. 5. Node 1102 identifies that the destination for the data is node 1110. Node 1102 uses a routing table or another suitable addressing mechanism to identify that both node 1104 and node 1112 may receive data with a destination of node 1110.

Node 1102 generates a first request to send data to node 1104 during a first number of time intervals. Node 1102 also generates a second request to send data to node 1112 during a second number of time intervals. The first number of time intervals may be the same intervals or different intervals than the second number of time intervals. Node 1102 then sends the first request to node 1104 and the second request to node 1112.

Node 1104 receives the first request and determines whether node 1104 is available during the first number of time intervals using a schedule. In the event that node 1104 is unavailable, node 1104 returns a rejection to node 1102. In these illustrative examples, node 1104 is available to receive data during the first number of time intervals.

Node 1104 then identifies that the destination of the data, according to the request, is node 1110. Node 1104 identifies that node 1106 is to receive data from node 1104 intended for node 1110. Thus, node 1104 generates a request to transmit data to node 1106 during a number of time intervals. Node 1104 sends the request to node 1106.

Node 1106 receives the request and processes the request from node 1104. The next node for data from node 1106 to node 1110 is node 1108. Thus, node 1106 generates and sends a request to node 1108. Likewise, node 1108 generates a request for node 1110 and sends the request to node 1110.

Once node 1110 receives the request from node 1108, node 1110 determines whether node 1110 is available during the number of time intervals. When node 1110 is available, node 1110 generates an approval and sends the approval to node 1108. Node 1108 receives the approval, generates an approval for node 1106, and sends the approval to node 1106. Likewise, node 1106 processes the approval and sends an approval to node 1104. Node 1104 processes the approval and sends an approval to node 1102. Thus, path 1140 is formed.

Likewise, path 1142 is formed by nodes 1102, 1112, 1114, 1106, 1116, 1118 and 1110 processing requests and approvals with respect to the schedules of the nodes. It should be noted that nodes 1102, 1106, and 1110 are members of both paths 1140 and 1142. For example, node 1106 may have reserved a first number of time intervals for data received from node 1104, and a second number of time intervals for data received from node 1114. Of course, in other advantageous embodiments, path 1140 and path 1142 may only have nodes 1102 and 1110 in common. For example, path 1140 may include node 1120 instead of node 1106. In such an advantageous embodiment, only nodes 1102 and 1110 are present in both path 1140 and path 1142.

Once paths 1140 and 1142 are formed, data is transmitted using path 1140. In addition to the data being transmitted with a destination of node 1110, information is transmitted in the opposite direction. In other words, information is transmitted from node 1110 to node 1108, from node 1108 to node 1106, from node 1106 to node 1104, and from node 1104 to node 1102. The information includes acknowledgments that each portion of the data transmitted by the nodes is received by the next node in path 1140.

In this advantageous embodiment, an inconsistency occurs at node 1108. For example, node 1108 may experience a lack of electrical power and be unable to receive or transmit data. Thus, node 1108 does not send acknowledgments to node 1106. After the expiration of a period of time without receiving a TCP/IP layer 2 or other acknowledgment, node 1106 determines that an inconsistency has developed for node 1108. A TCP/IP layer 2 acknowledgment is an acknowledgment transmitted at the data link layer of the TCP/IP network. An acknowledgment transmitted at the data link layer is transmitted from a first node to a second node having a shared link with the first node. However, the layer 2 acknowledgment is not transmitted to other nodes that do not share a link with the first node.

Node 1106 generates a notification and sends the notification to node 1104. Node 1104 sends the notification to node 1102. Alternatively, node 1102 may be alerted by a lack of acknowledgements from node 1110. Node 1102 receives the layer 2 notification or lack of acknowledgement and ceases transmitting data through path 1140. In some advantageous embodiments, the lack of acknowledgments refers to acknowledgments expected by the node to be received on TCP/IP layer 3 or higher. In other words, the lack of acknowledgments may refer to acknowledgments not received from nodes that do not share a link with node 1102, such as node 1110. Instead, node 1102 begins transmitting data though path 1142. Since no inconsistency is present in path 1142, data arrives at node 1110.

Figure 12:
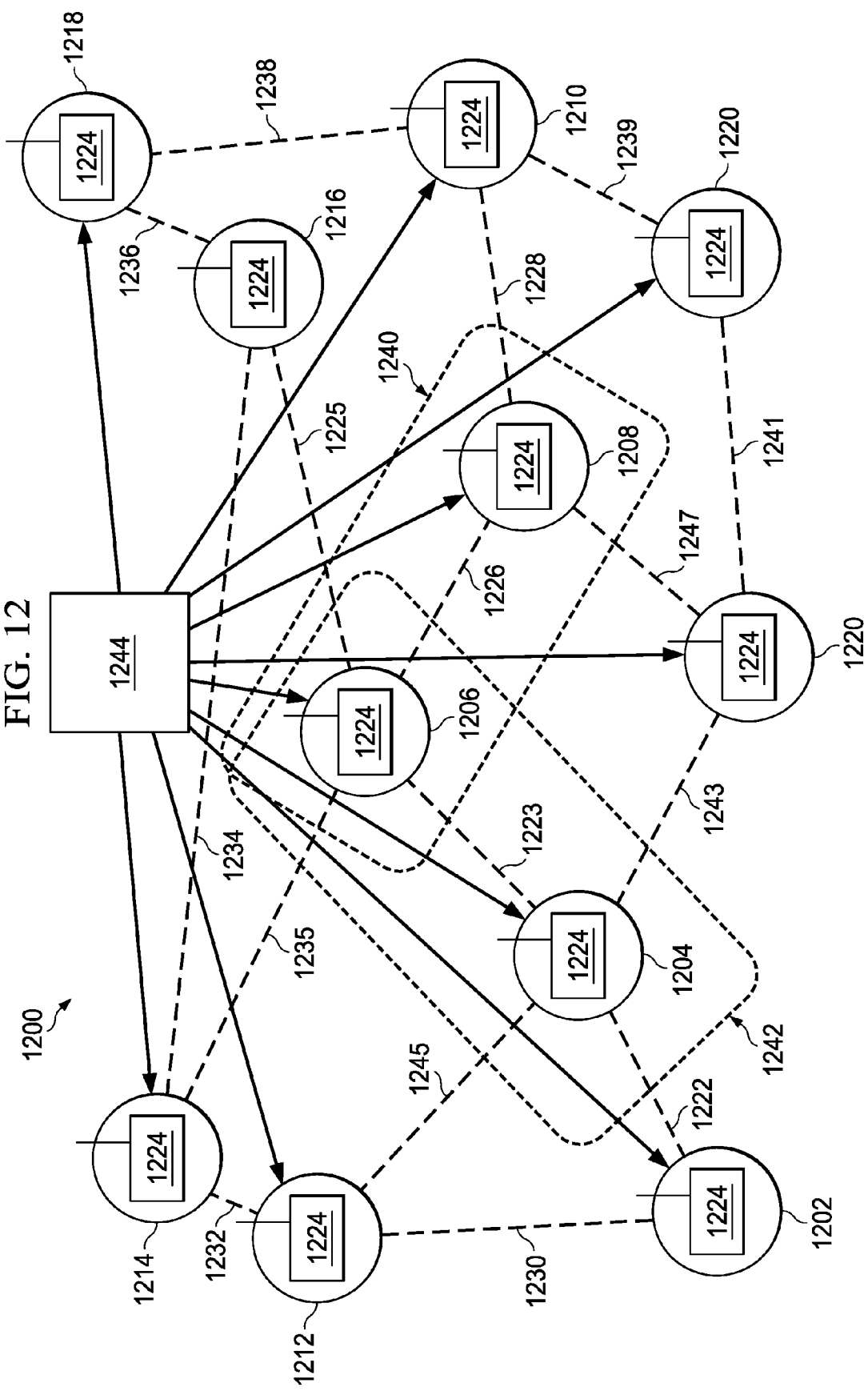
FIG. 12 is an illustration of a network that implements pre-reserved paths in accordance with an advantageous embodiment.

Turning now to FIG. 12, an illustration of a network that implements pre-reserved paths is depicted in accordance with an advantageous embodiment. Network 1200 is an example implementation of network 602 in FIG. 6. Network 1200 is an example of one implementation of network 302 in FIG. 3. In this illustrative example, network 1200 is similar to network 700 in that network 1200 contains the same nodes and links as network 700. However, network 1200 performs different and/or additional functions than network 700. For example, network 1200 implements pre-reserved paths 118 in FIG. 1.

Network 1200 includes nodes 1202, 1204, 1206, 1208, 1210, 1212, 1214, 1216, 1218, and 1220. Network 1200 also includes links 1222, 1223, 1225, 1226, 1228, 1230, 1232, 1234, 1235, 1236, 1238, 1239, 1241, 1243, 1245, and 1247. Links 1222, 1223, 1225, 1226, 1228, 1230, 1232, 1234, 1235, 1236, 1238, 1239, 1241, 1243, 1245, and 1247 connect pairs of nodes in network 1200. For example, link 1222 connects node 1202 and 1204. Each node also has time management system 1224. Time management system 1224 sets the reference time for each node using time source 1244. Time management system 1224 is an example implementation of time management system 312 in FIG. 3.

In this advantageous embodiment, node 1206 was disconnected from network 1200 for a period of time and is now being joined to network 1200. Node 1206 is powered on and reads configuration data, such as configuration data 626 in FIG. 6. The configuration data may include addresses of adjacent nodes with which reservations are to be generated. The addresses of the adjacent nodes, in this example, are nodes 1204 and 1208. While node 1214 is also adjacent to node 1206, information about node 1214 is not stored in the configuration data in this illustrative example.

In some advantageous embodiments, the configuration data also includes a number of time intervals for each adjacent node with which a reservation is to be generated. In other advantageous embodiments, node 1206 generates a message to nodes 1204 and 1208 indicating that node 1206 is online. The message may or may not be fully encrypted. In response to the message, nodes 1204 and 1208 may send a response that includes the number of time intervals. The response may or may not be fully encrypted. In this illustrative example, the number of time intervals is stored in the configuration data.

Nodes 1204 and/or 1208 may also be preconfigured with reservations for the number of time intervals stored in the configuration data for node 1206. In such an advantageous embodiment, node 1206 does not generate a request, since the number of time intervals is already reserved on nodes 1204 and 1208. Node 1206 may instead transmit data to nodes 1204 and 1208 during the number of time intervals without prior communication between node 1206 and nodes 1204 and 1208. The transmitted data may be fully encrypted.

Once the number of time intervals is reserved between node 1206 and node 1204, path 1242 is formed. Likewise, path 1240 is formed between node 1206 and node 1208 once the number of time intervals is reserved between nodes 1206 and 1208. In this illustrative example, assume that node 1202 receives data with a destination of node 1210. In such an advantageous example, node 1202 generates a request and sends the request to node 1204 in the same manner as nodes 1102 and 1104 in FIG. 11. The request may be fully encrypted. However, once node 1202 receives the request and identifies the destination as node 1210, node 1202 generates a request for node 1206 as the node to which data intended for node 1210 is sent. The request may be fully encrypted. The request for node 1206 is sent to node 1206 during the pre-reserved time intervals such that the request reaches node 1206 even in the event that node 1206 is experiencing delays or inconsistencies because a portion of network 1200 is at or near maximum capacity for data.

Node 1206 receives the request during the time interval with which node 1206 has a reservation with node 1204. Node 1206 processes the request in the same manner as node 1106 in FIG. 11. However, node 1206 identifies the reservation between node 1206 and node 1208. Thus, node 1206 transmits the request to node 1208 during the number of time intervals. The request may be fully encrypted. Likewise, approvals may be transmitted from node 1208 to node 1206 and from node 1206 to node 1204 during the number of time intervals to avoid congestion in network 1200. The approvals may be fully encrypted.

The illustration of network 1200 in FIG. 12 is not meant to imply physical or architectural limitations to the manner in which different advantageous embodiments may be implemented. Other components in addition to and/or in place of the ones illustrated may be used. For example, in the event that each node in network 1200 is started, connected, and/or joined to network 1200 substantially simultaneously with pre-reserved time intervals for layer 2 paths, then every node in network 1200 could also have pre-reserved paths and/or time intervals for layer 3 and layer 4 communications.

For example, a human manager of a fixed-wired network may already know the positions and propagation times of all the nodes before the nodes in the network are started, connected, and/or joined to the network. Thus, the paths from a source node to a destination node, such as node 1202 to node 1210, respectively, may be configured to be established without human interaction at the time all the nodes are started, connected, and/or joined. In advantageous embodiments in which the propagation time between nodes is substantially zero, pre-established time intervals and paths could be configured prior to starting, connecting, and/or joining the nodes.

Figure 13:
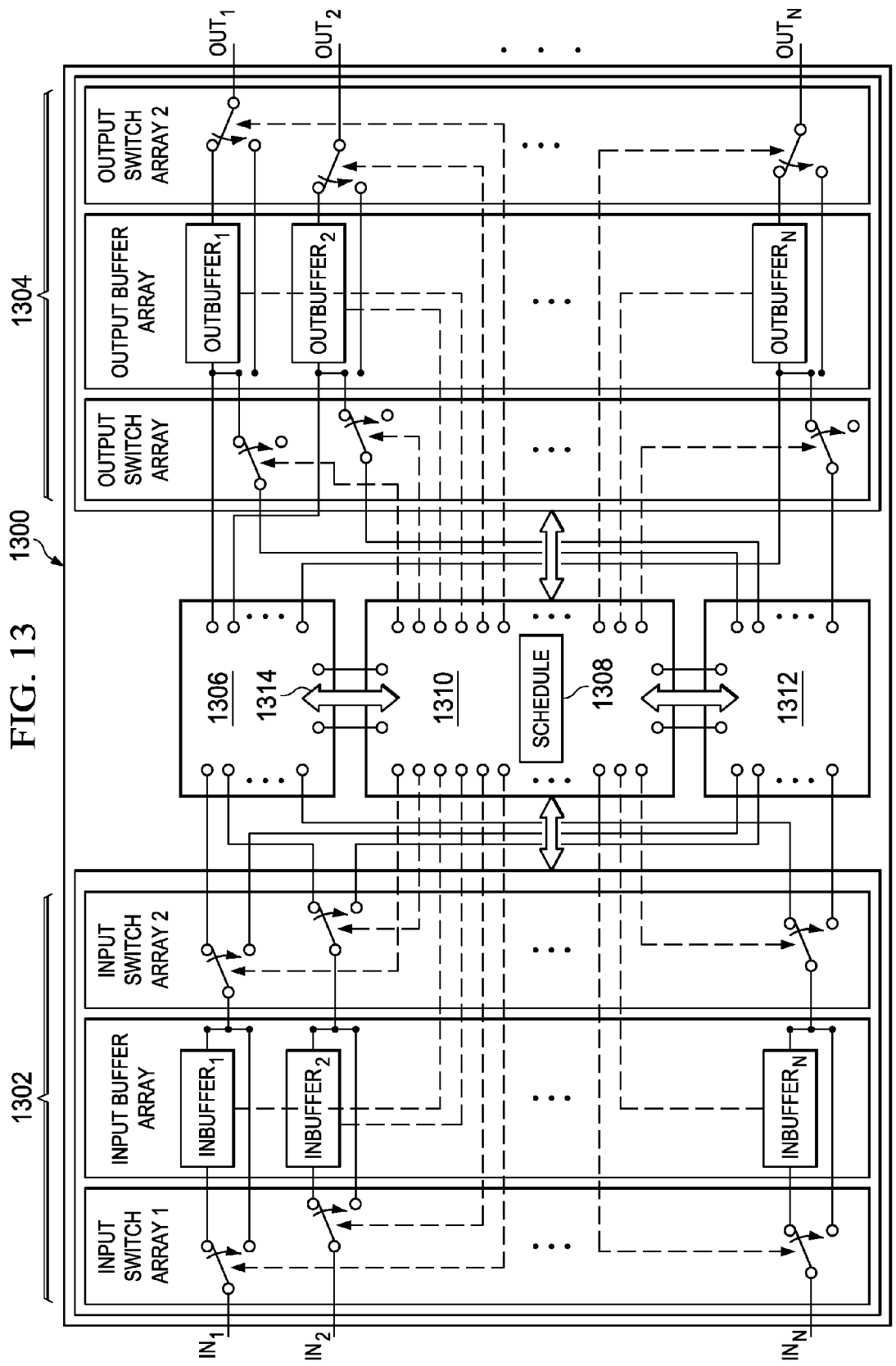
FIG. 13 is an illustration of a node in accordance with an advantageous embodiment.

Turning to FIG. 13, an illustration of a node is depicted in accordance with an advantageous embodiment. Node 1300 is an example of one implementation of next node 342 in FIG. 3.

In this illustrative example, node 1300 includes input buffers 1302, output buffers 1304, switch 1306, time management system 1308, network reservation system 1310, and switch 1312. Input buffers 1302 are channels through which data is received from a network. Output buffers 1304 are channels through which data is sent out to a network. The components of node 1300 are depicted as hardware in this advantageous embodiment. However, one or more components may also be implemented as a process running on a processing unit, an integrated circuit, or another suitable implementation.

Switch 1306 processes data that is not received during a number of time intervals known to network reservation system 1310. Switch 1306 receives data on input buffers 1302 and sends data to a next node for the data using output buffers 1304. Switch 1306 uses the destination header of the data to identify the next node for the data. Switch 1306 may contain additional or fewer buffers in other advantageous embodiments.

Time management system 1308 receives a signal containing information about the time. Time management system 1308 sets the reference time for node 1300 to the time received in the signal. Time management system 1308 is an example implementation of time management system 312 in FIG. 3.

Network reservation system 1310 receives requests from other nodes through input buffers 1302 to send data to node 1300 at a number of time intervals. In this advantageous embodiment, network reservation system 1310 is connected to switch 1306 using link 1314 such that network reservation system 1310 is assigned an address on the network and may receive requests at the particular address. In other advantageous embodiments, link 1314 is absent, and network reservation system 1310 only receives requests that arrive at input buffers 1302 at reserved time intervals that are a part of pre-reserved paths 118 in FIG. 1.

In this illustrative example, network reservation system 1310 receives a request to reserve a number of time intervals from another node in the network. Network reservation system 1310 generates a request to the next node for the data to be transmitted using the destination for the data included with the request. Once network reservation system 1310 receives an approval from the next node, network reservation system 1310 adds the reservation to a schedule and sends an approval to the node that sent the request.

When the number of time intervals occurs, network reservation system 1310 switches input buffers 1302 and output buffers 1304 to be connected to switch 1312 instead of switch 1306. In some advantageous embodiments, network reservation system 1310 determines that the data is intended to be received by switch 1312 by identifying a flag or other identifier in the data that is received when the number of time intervals occurs. Switch 1312 receives the data sent by the node that made the reservation with node 1300. Switch 1312 sends the data to the next node without identifying any information about the data, including the source or destination of the data. In some advantageous embodiments, the data, including the source and destination for the data, are encrypted. Of course, in other advantageous embodiments, the data is encrypted excluding the source and destination. The source and destination for the data may also be encrypted, while the remainder of the data is unencrypted in other advantageous embodiments. Switch 1312 does not decrypt the data to identify the source or destination. Once the time interval ends, network reservation system 1310 switches input buffers 1302 and output buffers 1304 back to switch 1306 to resume processing of other data.

Turning now to FIG. 14, an illustration of a schedule is depicted in accordance with an advantageous embodiment. Schedule 1400 is an example implementation of schedule 344 in FIG. 3.

Schedule 1400 is in the form of a table in this illustration. However, schedule 1400 may be stored in a linked list, database, text file, binary file, or other suitable data structure. Schedule 1400 includes time 1402, input 1404, output 1406, status 1408, time to kill 1409, time offset 1410, and propagation delay 1412. Time 1402 indicates the interval at which the reservation may be used to transmit data. Time 1402 may be in the form of absolute time, current time, time relative to a reference time, synchronized time to a reference time, or another suitable measurement of time. Input 1404 indicates the input buffer or interface on which the data is to be received. For example, identifiers for input buffers 1302 in FIG. 13 may be used. Likewise, output 1406 indicates the output buffer or interface on which the data is to be transmitted. For example, identifiers for output buffers 1304 in FIG. 13 may be used.

Status 1408 indicates whether the particular time interval is "scheduled", "tentative", or "available." Entry 1416 indicates that status 1408 is "scheduled." Status 1408 of "scheduled" means that the path is formed and that the node will process the data received at that time interval by receiving data on the input in input 1404 and transmitting the data on the output in output 1406.

Entry 1418 indicates that status 1408 is "tentative." "Tentative" for status 1408 means that a request was received for the time interval, and the time interval was available. However, a request was sent by the node using schedule 1400 to another node that has not yet sent an approval to the node using schedule 1400. Entry 1420 has status 1408 of "available." "Available" for status 1408 means that the time interval is available for reservations and is not being used in an existing reservation.

Time to kill 1409 is the amount of time before the reservation is removed from schedule 1400. Time to kill 1409 may be a particular value or may be absent for permanent reservations in schedule 1400. Time offset 1410 is the difference in the reference times between the node using schedule 1400 and the node to which data is sent during the time interval for the reservation. Propagation delay 1412 is the amount of time taken for data to travel from the node using schedule 1400 and the node to which data is sent during the time interval for the reservation.

In some advantageous embodiments, pre-reserved time interval 1414 may also be present. Pre-reserved time interval 1414 is used to receive and transmit data along a pre-reserved path, such as pre-reserved paths 118 in FIG. 1. Pre-reserved time interval 1414 may be generated based on configuration data for the node, user input, messages received from other nodes in the network, or another suitable source.

In some advantageous embodiments, pre-reserved time interval 1414 may be reserved for transmitting data that is not received in accordance with another entry in schedule 1400. In other words, pre-reserved time interval 1414 may be used to transmit data that is not being transmitted or received along a path.

Figure 15:
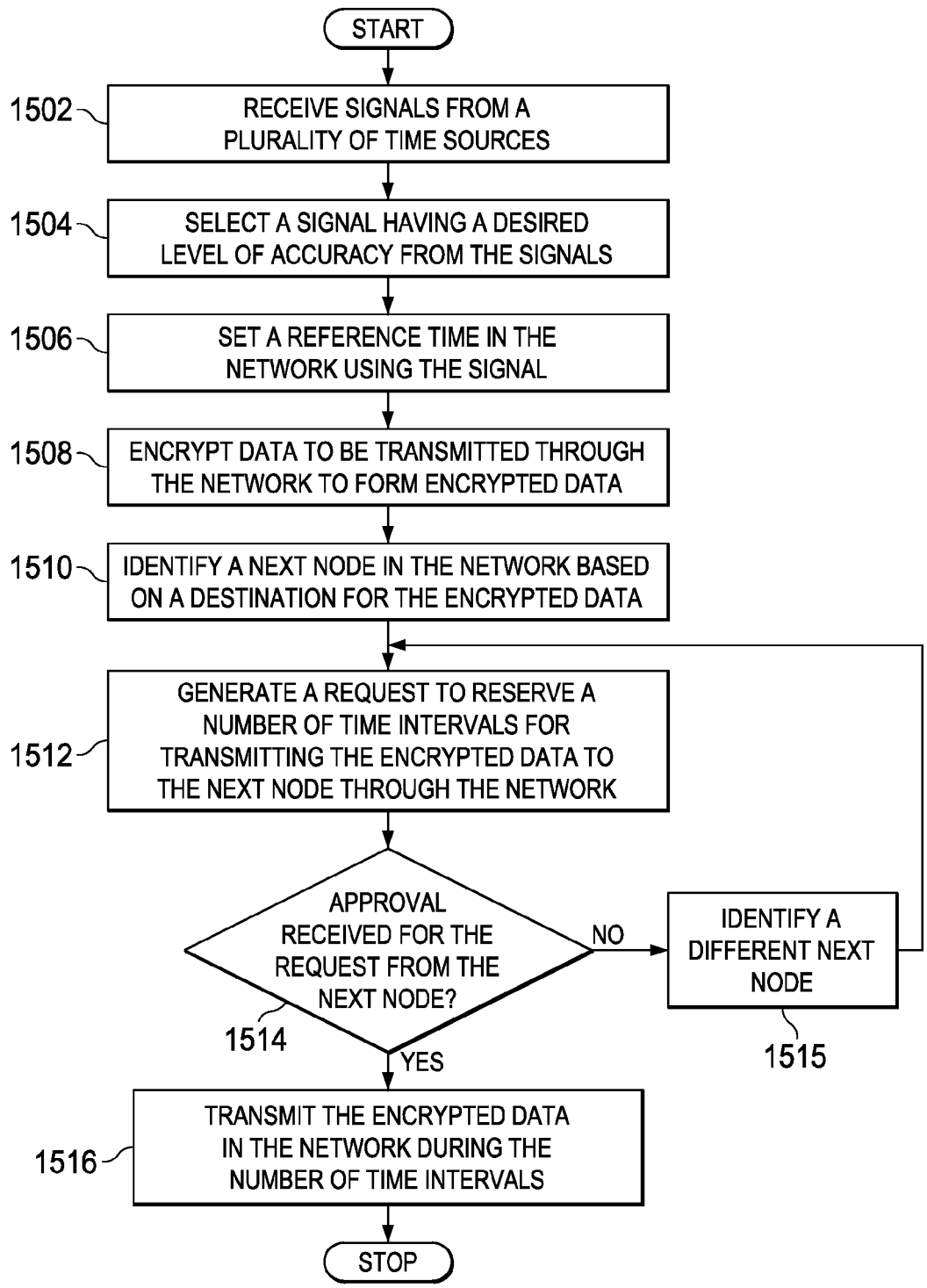
FIG. 15 is an illustration of a flowchart of a process for managing a network in accordance with an advantageous embodiment.

Turning now to FIG. 15, an illustration of a flowchart of a process for managing a network is depicted in accordance with an advantageous embodiment. The process may be performed by network management module 310 running on computer system 304 in FIG. 3. The process begins by receiving signals from a plurality of time sources (operation 1502). The plurality of time sources may be plurality of time sources 324 in FIG. 3. The process selects a signal having a desired level of accuracy from the signals (operation 1504). The signal may be signal 322, the desired level of accuracy may be desired level of accuracy 326, and signals may be signals 321 in FIG. 3. Next, the process sets a reference time in the network using the signal (operation 1506). The reference time may include an absolute time, a current time, a relative time, a synchronized time, and/or another suitable type of time. The reference time may be reference time 320 and the source node may be source node 306 in FIG. 3.

The process then may encrypt data to be transmitted through the network to form encrypted data, wherein the encrypted data comprises a number of encrypted headers and an encrypted body (operation 1508). The data may be data 328, and the source node may be source node 306 in FIG. 3. The network may be network 302, and the encrypted data may be encrypted data 354 in FIG. 3. Likewise, the encrypted headers may be encrypted headers 356, and the encrypted body may be encrypted body 358 in FIG. 3. Next, the process identifies a next node in the network based on a destination for the encrypted data (operation 1510). The next node may be next node 342, and the destination may be destination 340 in FIG. 3. The process generates a request to reserve a number of time intervals for transmitting the encrypted data to the next node through the network, wherein a time interval is a time between transmission of the encrypted data in the network using the reference time (operation 1512). The request may be request 347, and the number of time intervals may be number of time intervals 332 in FIG. 3. The time interval may be time interval 334 in FIG. 3.

Thereafter, the process determines whether an approval for the request from the next node was received (operation 1514). The approval may be approval 350 in FIG. 3. If, at operation 1514, the process determines that an approval for the request from the next node was not received, the process identifies a different next node (operation 1515). The process then returns to operation 1512. The process uses the different next node instead of the next node in performing operations 1512, 1514, and 1516. If, however, at operation 1514 the process determines that an approval for the request from the next node was received, the process transmits the encrypted data in the network during the number of time intervals (operation 1516) and terminates thereafter.

Figure 16:
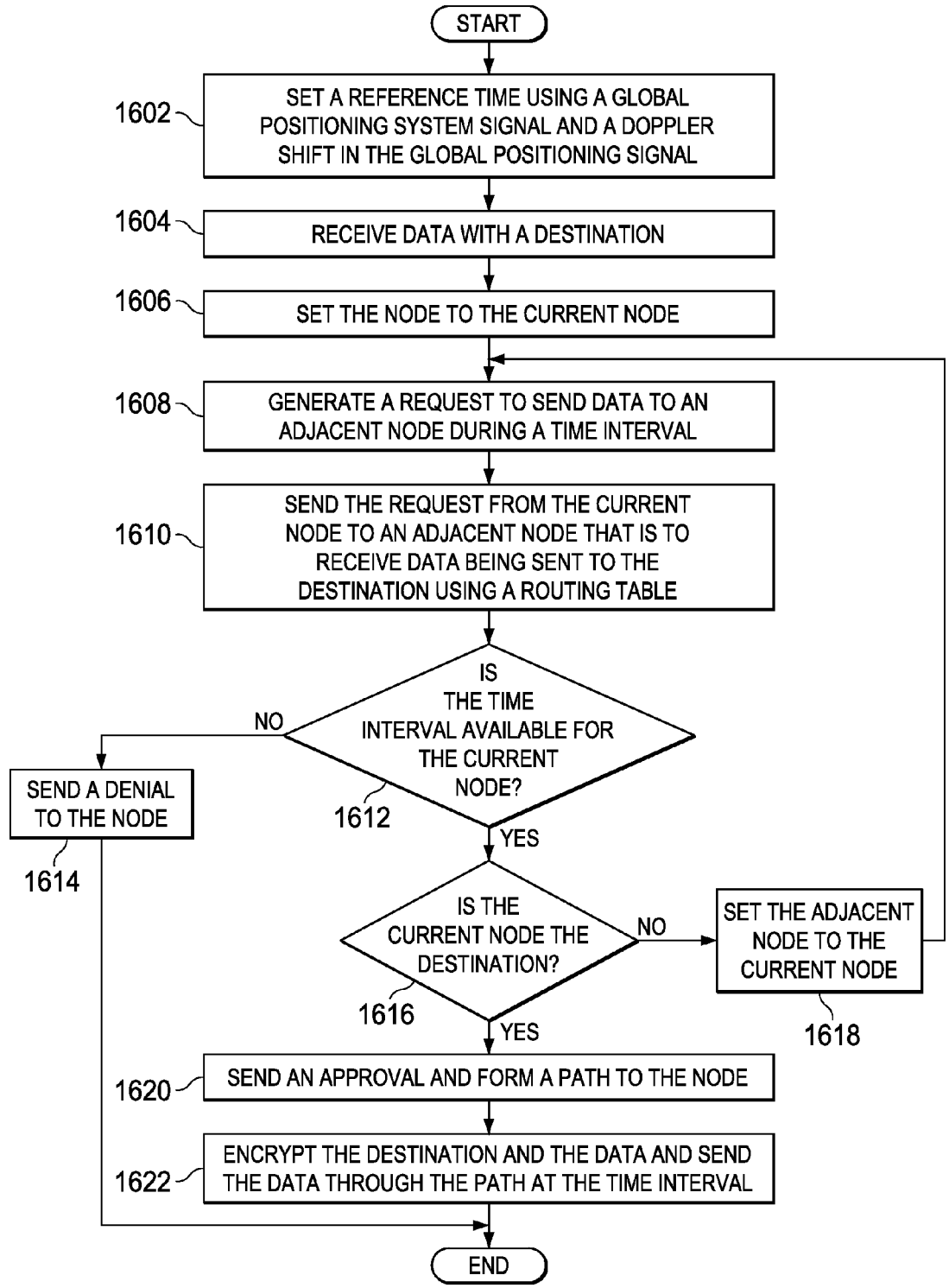
FIG. 16 is an illustration of a flowchart of a process for full packet encryption in accordance with an advantageous embodiment.

Turning now to FIG. 16, an illustration of a flowchart of a process for full packet encryption is depicted in accordance with an advantageous embodiment. The process may be performed by network management module 310 running on computer system 304 in FIG. 3. The process begins by setting a reference time for a node using a satellite time signal and/or a Doppler shift in the satellite time signal (operation 1602). The accuracy of the satellite time signal may be increased by identifying the Doppler shift in the satellite time signal. The satellite time signal may be satellite time signal 404 and the Doppler shift may be Doppler shift 406 in FIG. 4. Of course, in other advantageous embodiments, additional and/or other time sources may be used to perform operation 1602.

Next, the process receives data with a destination (operation 1604). The process sets the node to the current node (operation 1606). Thereafter, the process generates a request to send data to an adjacent node during a time interval (operation 1608). The process then sends the request from the current node to an adjacent node that is to receive data being sent to the destination using a routing table (operation 1610). The process then determines whether or not the time interval is available for the current node (operation 1612).

If at operation 1612 the process determines that the time interval is not available for the current node, the process sends a denial to the node (operation 1614) and terminates. Alternatively, if the process determines, at operation 1612, that the time interval is not available for the current node, the process may return to operation 1608 and generate a request to send data to a different adjacent node during a time interval such that a different node that approves the request is used in generating the path. If, however, at operation 1612 the process determines that the time interval is available for the current node, the process determines whether or not the current node is the destination (operation 1616).

If at operation 1616 the process determines that the current node is not the destination, the process sets the adjacent node to the current node (operation 1618) and returns to operation 1608. If, however, at operation 1616 the process determines that the current node is the destination, the process sends an approval and forms a path to the node (operation 1620). Next, the process encrypts the destination and the data and sends the data through the path at the time interval (operation 1622) and terminates thereafter.

Figure 17:
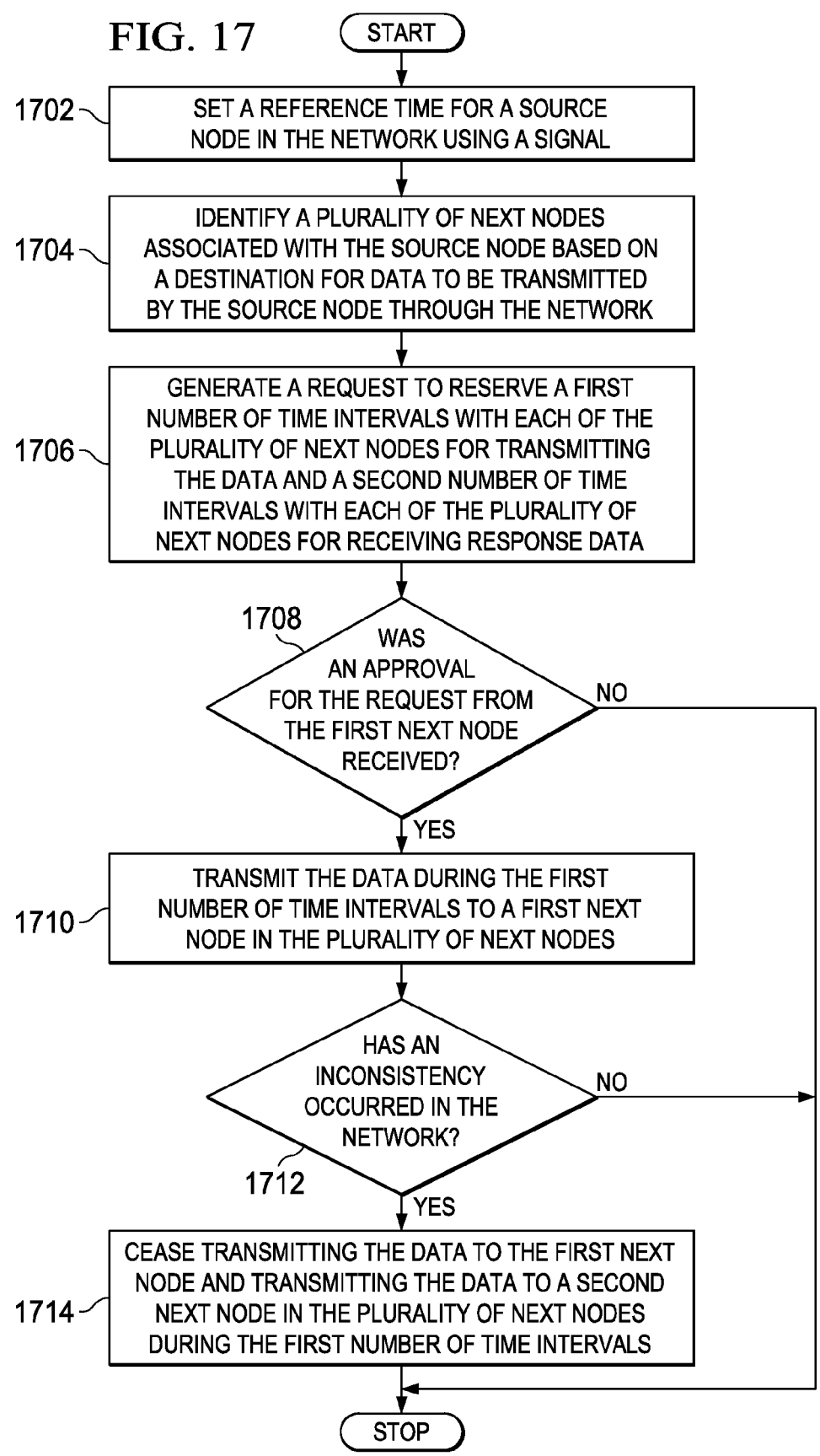
FIG. 17 is an illustration of a flowchart of a process for managing an inconsistency in a network in accordance with an advantageous embodiment.

With reference to FIG. 17, an illustration of a flowchart of a process for managing an inconsistency in a network is depicted in accordance with an advantageous embodiment. The process may be performed by network management module 514 running on computer system 504 in FIG. 5. The process begins by setting a reference time in a network using a signal (operation 1702). The reference time may be reference time 526, the source node may be source node 510, and the signal may be signal 528 in FIG. 5. The process then identifies a plurality of next nodes associated with the source node based on a destination for data to be transmitted through the network (operation 1704). The destination may be destination 524 in FIG. 5.

Next, the process generates a request to reserve a first number of time intervals with each of the plurality of next nodes for transmitting the data and a second number of time intervals with each of the plurality of next nodes for receiving response data, wherein a time interval is a time between transmission of the data in the network using the reference time (operation 1706). The request may be request 530 in FIG. 5, and the first number of time intervals may be number of time intervals 534 in FIG. 5. The second number of time intervals may be number of time intervals 546 in FIG. 5, and the response data may be response data 548 in FIG. 5. The time interval may be time interval 536, and the time may be time 538 in FIG. 5.

Thereafter, the process determines whether or not an approval for the request from the first next node has been received (operation 1708). The approval may be approval 552 in FIG. 5. If, at operation 1708, the process determines that an approval for the request from the first next node has not been received, the process terminates. Alternatively, if at operation 1708 the process determines that an approval for the request from the first next node has not been received, the process may return to process 1704 to identify a different plurality of next nodes associated with the source node based on a destination for data to be transmitted through the network. If, however, at operation 1708 the process determines that an approval for the request from the first next node has been received, the process transmits the data during the first number of time intervals to a first next node in the plurality of next nodes (operation 1710). The first next node may be next node 542 in FIG. 5.

The process then determines whether an inconsistency occurred in the network (operation 1712). The determination of an inconsistency may be through either a notification of an inconsistency in the network received from the first next node in the plurality of next nodes, a lack of messages received from the first next node, or a lack of acknowledgements received from the first next node in the plurality of next nodes. The determination may be determination 563 in FIG. 5. If, at operation 1712, the process determines that an inconsistency has not occurred in the network, the process terminates. If, however, at operation 1712 the process determines that an inconsistency in the network exists through the first next node in the plurality of next nodes, the process ceases transmitting the data to the first next node and transmits the data to a second next node in the plurality of next nodes during the first number of time intervals (operation 1714). The second next node may be next node 550 in FIG. 5. The process terminates thereafter.

Figure 18:
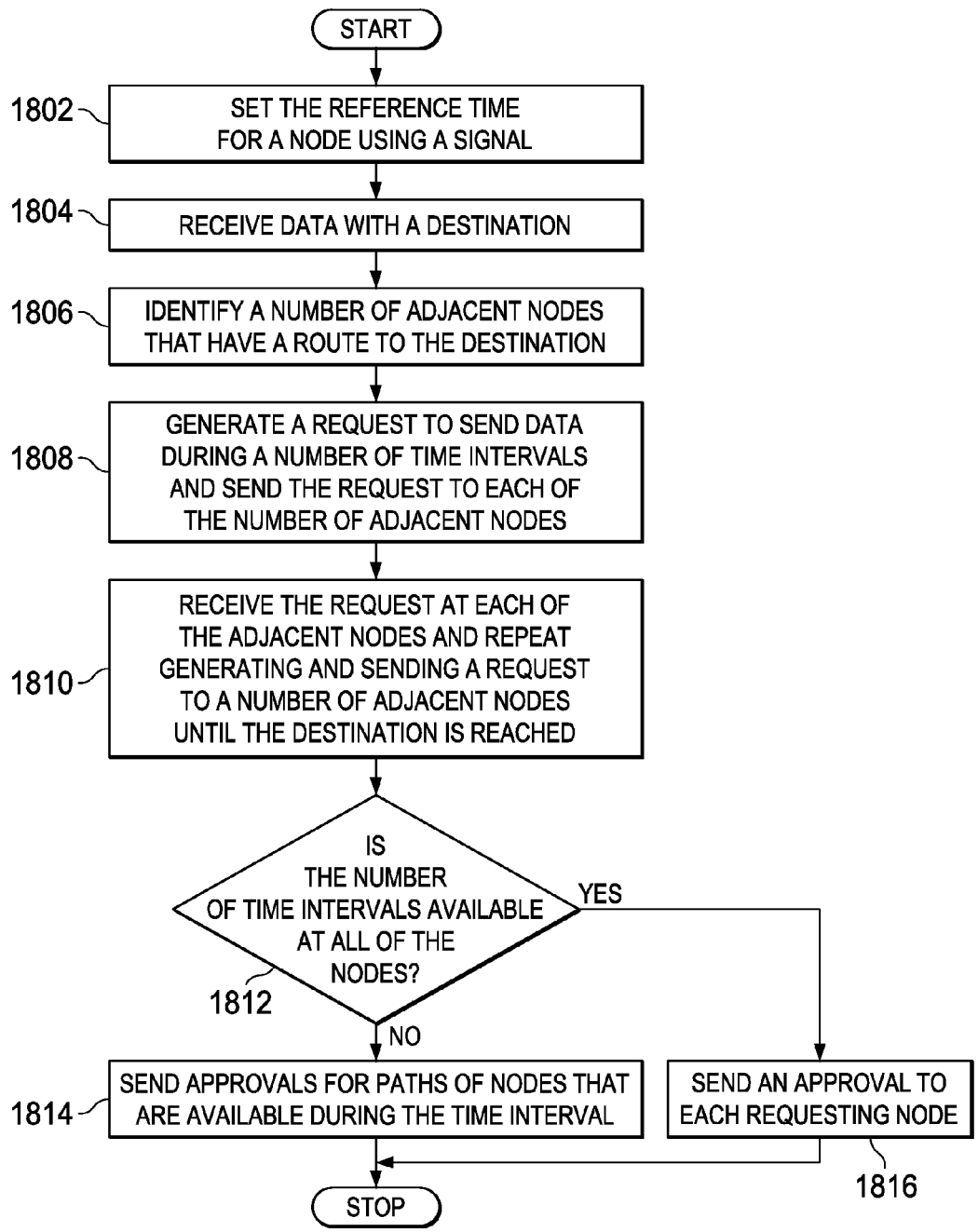
FIG. 18 is an illustration of a flowchart of a process for generating a backup path in accordance with an advantageous embodiment.

Turning now to FIG. 18, an illustration of a flowchart of a process for generating a backup path is depicted in accordance with an advantageous embodiment. The process may be performed by network management module 310 running on computer system 304 in FIG. 3. The process begins by setting the reference time for a node using a signal (operation 1802). The process receives data with a destination (operation 1804). The process identifies a number of adjacent nodes that have a route to the destination (operation 1806). Next, the process generates a request to send data during a number of time intervals and sends the request to each of the number of adjacent nodes (operation 1808). The process then receives the request at each of the adjacent nodes and repeats generating and sending a request to a number of adjacent nodes until the destination is reached (operation 1810).

Next, the process determines whether or not the number of time intervals is available at all of the nodes (operation 1812). If, at operation 1812, the process determines that the number of time intervals is not available at all of the nodes, the process sends approvals for paths of nodes that are available during the time interval (operation 1814) and terminates thereafter. If, however, at operation 1812, the process determines that the number of time intervals is available at all of the nodes, the process sends an approval to each requesting node (operation 1816) and terminates thereafter.

Figure 19:
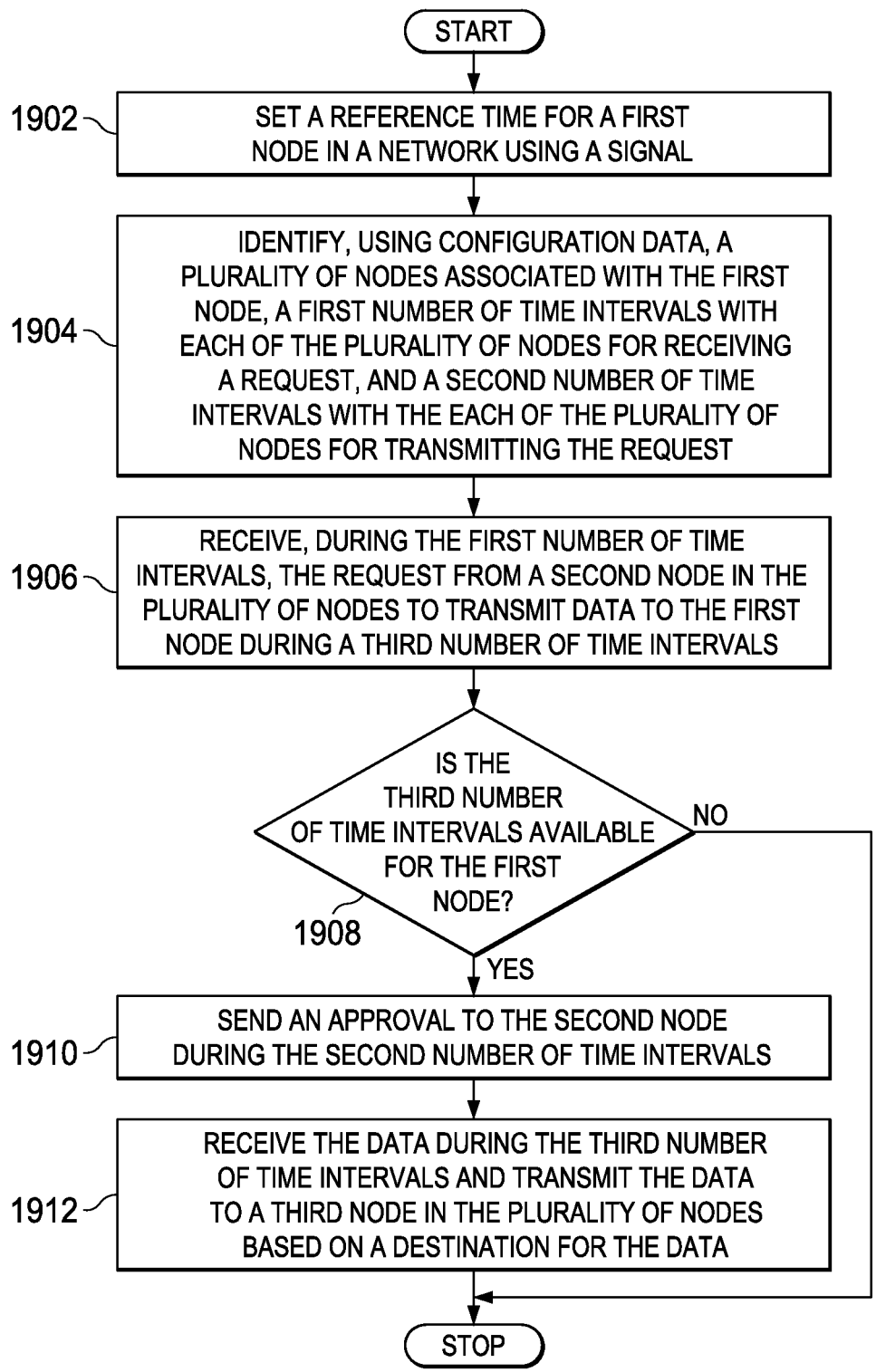
FIG. 19 is an illustration of a flowchart of a process for configuring a node in accordance with an advantageous embodiment.

Turning now to FIG. 19, an illustration of a flowchart of a process for configuring a node is depicted in accordance with an advantageous embodiment. The process may be performed by network management module 614 running on computer system 604 in FIG. 6. The process begins by setting a reference time for a first node in a network using a signal (operation 1902). The reference time may be reference time 622, the first node may be node 610, the network may be network 602, and the signal may be signal 624 in FIG. 6. The process then identifies, using configuration data, a plurality of nodes associated with the first node, a first number of time intervals with each of the plurality of nodes for receiving a request, and a second number of time intervals with the each of the plurality of nodes for transmitting the request, wherein a time interval is a time between transmission of the request by the first node in the network using the reference time (operation 1904). The configuration data may be configuration data 626, the plurality of nodes may be plurality of nodes

606, the first number of time intervals may be number of time intervals 628, and the request may be request 632 in FIG. 6. The second number of time intervals may be number of time intervals 630, the time interval may be time interval 641, the time may be time 643, and the transmission may be transmission 645 in FIG. 6.

Next, the process receives, during the first number of time intervals, the request from a second node in the plurality of nodes to transmit data to the first node during a third number of time intervals (operation 1906). The second node may be node 634, the data may be data 636, and the third number of time intervals may be number of time intervals 638 in FIG. 6.

The process then determines whether or not the third number of time intervals is available for the first node (operation 1908). If, at operation 1908, the process determines that the third number of time intervals is not available for the first node, the process terminates. Alternatively, if at operation 1908 the process determines that the requested third number of time intervals is not available for the first node, the process may then return to operation 1906 to receive a second request during the first number of time intervals. The second request is a request to transmit data from the second node in the plurality of nodes to the first node during an alternative third number of time intervals. If, however, at operation 1908, the process determines that the third number of time intervals is available for the first node, the process sends an approval to the second node during the second number of time intervals (operation 1910). The approval may be approval 654 in FIG. 6.

Thereafter, the process receives the data during the third number of time intervals and transmits the data to a third node in the plurality of nodes based on a destination for the data (operation 1912) and terminates thereafter. The third node may be node 640 in FIG. 6.

Figure 20:
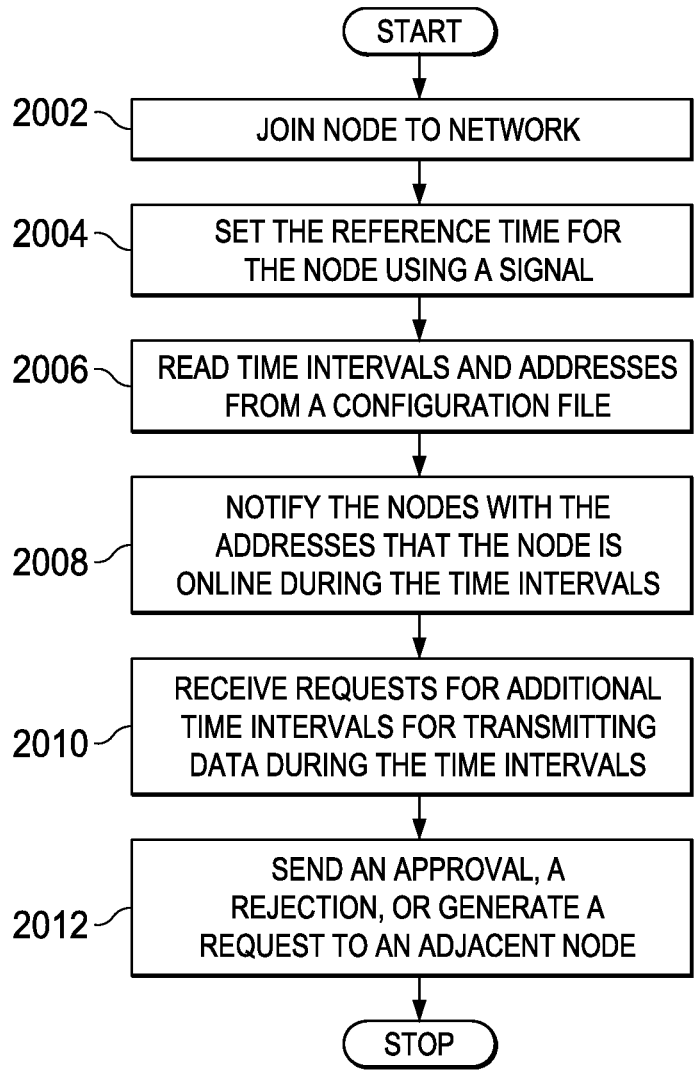
FIG. 20 is an illustration of a flowchart of a process for joining a node to a network in accordance with an advantageous embodiment.

Turning now to FIG. 20, an illustration of a flowchart of a process for joining a node to a network is depicted in accordance with an advantageous embodiment. The process may be performed by network management module 614 running on computer system 604 in FIG. 6. The process begins by joining a node to a network (operation 2002). The process then sets the reference time for the node using a signal (operation 2004). Next, the process reads time intervals and addresses from a configuration file (operation 2006).

Thereafter, the process notifies the nodes with the addresses that the node is online during the time intervals (operation 2008). The process receives requests for additional time intervals for transmitting data during the time intervals (operation 2010). Then, the process sends an approval, a rejection, or generates a request to an adjacent node (operation 2012) and terminates thereafter.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits or field programmable gate arrays that are manufactured or configured to perform one or more operations in the flowcharts or block diagrams.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. For example, encryption may be done concurrently or in an order different from the order depicted in the figures. Also, other blocks may be added in addition to the illustrated blocks in a flowchart or block diagram.

For example, the process may receive time intervals and/or addresses from user input or messages received from other nodes at operation 2006 in FIG. 20. Additionally, the process may limit the number of adjacent nodes to which a request is sent based on a rule at operation 1808 in FIG. 18. For example, the rule may indicate that the number of requests generated is to be below a threshold. Alternatively, the rule may indicate that requests should be generated for about half of the adjacent nodes that have a route to the destination.

Additionally, in some advantageous embodiments, a determination is made at operation 1712 in FIG. 17 that the inconsistency has occurred in the network, but the first next node is not affected by the inconsistency. In such advantageous embodiments, the process returns to operation 1710 to transmit data and does not perform operation 1714 in FIG. 17.

Thus, the different advantageous embodiments allow data to travel through a network without the source or destination being known to an unauthorized party receiving the data within the network. Additionally, data transmitted through the network while the network is at or near maximum capacity for data will still arrive without being delayed by the processing of other data.

Further, the different advantageous embodiments allow a node to be joined to the network while the network is at or near maximum capacity because the nodes being joined to the network have pre-existing time reservations with adjacent nodes. Finally, the different advantageous embodiments allow for a node in a reserved path to cease functioning normally without affecting delivery of the data to the destination. The source node may switch to a backup path to continue delivering the data.

Thus, the different advantageous embodiments provide an apparatus and a method for managing a network. Signals are received from a plurality of time sources. A signal having a desired level of accuracy is selected from the signals. A reference time in the network is set using the signal. Data to be transmitted through a network may be encrypted to form encrypted data. The encrypted data comprises a number of encrypted headers and an encrypted body. A next node in the network is identified based on a destination for the encrypted data. A request is generated to reserve a number of time intervals for transmitting the encrypted data to the next node through the network. A time interval is a time between transmission of the encrypted data in the network using the reference time. The encrypted data is transmitted in the network during the number of time intervals responsive to receiving an approval for the request from the next node.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non-limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical, optical, or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output, or I/O devices, can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    a time management system configured to receive signals from a plurality of time sources, select a signal having a desired level of accuracy from the signals, and set a reference time in a network associated with the time management system using the signal;
    a cryptography system configured to encrypt data to be transmitted through the network to form encrypted data wherein the encrypted data comprises a number of encrypted headers and an encrypted body;
    a network reservation system configured to
        identify a plurality of next nodes in the network based on a destination for the encrypted data,
        wherein the plurality of next nodes are indirectly connected to a source node from which the encrypted data is sent to the destination via at least one other node, the destination being among the plurality of next nodes,
        wherein the network reservation system is further configured to generate a request to reserve a number of time intervals with each of the plurality of next nodes for transmitting the encrypted data to the plurality of next nodes through the network,
        wherein a time interval is a time between transmission of the encrypted data in the network using the reference time, and
        wherein the network reservation system is further configured to selectively implement pre-reserved paths along the plurality of next nodes for transmitting the encrypted data; and
    a network interface configured to transmit the encrypted data in the network during the number of time intervals responsive to receiving an approval for the request from the plurality of next nodes, and wherein the encrypted data is transmitted through the plurality of next nodes without decryption until the encrypted data arrives at the destination.

2. The apparatus of claim 1, wherein the time management system, the cryptography system, the network reservation system, and the network interface form the source node.

3. The apparatus of claim 2, wherein the plurality of next nodes are configured to receive the request to reserve the number of time intervals, determine whether the number of time intervals are available at the plurality of next nodes using a schedule, and send the approval for the request to the source node responsive to a determination that the number of time intervals are available at the plurality of next nodes.

4. The apparatus of claim 2, wherein when the request for the number of time intervals is sent to a next node by the source node, the source node also sends a request for another number of time intervals to a second next node.

5. The apparatus of claim 3, wherein the request is a first request and the number of time intervals is a first number of time intervals, and wherein the plurality of next nodes are further configured to determine whether a particular node in the plurality of next nodes is the destination responsive to receiving the request and generate a second request to transmit the encrypted data to an additional node in the plurality of next nodes during a second number of time intervals responsive to the determination that the particular next node is not the destination.

6. The apparatus of claim 5, wherein the plurality of next nodes are further configured to receive the encrypted data during the first number of time intervals and send the encrypted data to the additional node during the second number of time intervals without decrypting the encrypted data.

7. The apparatus of claim 1, wherein the encrypted data is encrypted such that the encrypted data does not have an unencrypted portion.

8. The apparatus of claim 1, wherein the plurality of time sources comprises a number of satellites and in being configured to receive the signals, the time management system is configured to identify a Doppler shift between transmissions of a satellite time signal from the number of satellites.

9. The apparatus of claim 1, wherein the data is first data and the network interface is further configured to transmit second data during the number of time intervals when the encrypted data is unavailable.

10. The apparatus of claim 1, wherein the plurality of time sources is selected from a global positioning system, an atomic clock, a vehicle, a local clock, and a number of network transmitters.

11. The apparatus of claim 1, wherein the plurality of next nodes include a first next node and further comprising:
an inconsistency management system configured to cause the network reservation system to identify a second next node in the plurality of next nodes based on the destination, further cause the network reservation system to generate a second request to reserve the number of time intervals for transmitting the encrypted data to the second next node when the network reservation system generates the request to reserve the number of time intervals for transmitting the encrypted data to the plurality of next nodes, receive a notification of an inconsistency in the network from the first next node, cause the network interface to cease transmitting the data to the first next node, and cause the network interface to transmit the data to the second next node during the number of time intervals responsive to receiving the notification of the inconsistency.

12. The apparatus of claim 1,
the time management system configured to
identify, from the signals, the signal with the desired level of accuracy that is an amount of specificity of the signal with respect to time, and
set the reference time using a signal with a highest accuracy of the plurality of time sources when multiple ones of the signals exceed the desired level of accuracy.

13. A method for managing a network comprising:
receiving signals from a plurality of time sources;
selecting a signal having a desired level of accuracy from the signals;
setting a reference time in the network using the signal;
encrypting data to be transmitted through the network to form encrypted data, wherein the encrypted data comprises a number of encrypted headers and an encrypted body;
identifying, by a network reservation system, a plurality of next nodes in the network based on a destination for the encrypted data, wherein the plurality of next nodes are indirectly connected to a source node from which the encrypted data is sent to the destination via at least one other node, the destination being among the plurality of next nodes;
generating, by the network reservation system, a request to reserve a number of time intervals with each of the plurality of next nodes for transmitting the encrypted data to the plurality of next nodes through the network, wherein a time interval is a time between transmission of the encrypted data in the network using the reference time and wherein pre-reserved paths for transmitting the encrypted data are selectively implemented; and
responsive to receiving an approval for the request from the plurality of next nodes, transmitting the encrypted data in the network during the number of time intervals through the plurality of next nodes without decryption until the encrypted data arrives at the destination.

14. The method of claim 13, wherein the steps of receiving, selecting, setting, encrypting, identifying, generating, and transmitting are performed by the source node.

15. The method of claim 14 further comprising:
receiving the request to reserve the number of time intervals;
determining whether the number of time intervals are available at the plurality of next nodes using a schedule; and
responsive to a determination that the number of time intervals are available at the next node, sending the approval for the request to the source node.

16. The method of claim 15, wherein the request is a first request and the number of time intervals is a first number of time intervals, and further comprising:
determining whether a particular node in the plurality of next nodes is the destination responsive to receiving the request; and
responsive to a determination that the particular node is not the destination, generating a second request to transmit the encrypted data to an additional node in the plurality of next nodes during a second number of time intervals.

17. The method of claim 16 further comprising:
receiving the encrypted data during the first number of time intervals; and
sending the encrypted data to the additional node during the second number of time intervals without decrypting the encrypted data.

18. The method of claim 13, wherein the encrypted data comprises a number of encrypted headers and an encrypted body.

19. The method of claim 13, wherein the encrypted data is encrypted such that the encrypted data does not have an unencrypted portion.

20. The method of claim 13, wherein the plurality of time sources comprises a number of satellites and receiving the signals identifying a Doppler shift between transmissions of a satellite time signal from the number of satellites.

21. The method of claim 13, wherein the data is first data and further comprising:
transmitting second data during the number of time intervals when the encrypted data is unavailable.

22. The method of claim 13, wherein the plurality of time sources is selected from a global positioning system, a vehicle, a local clock, an atomic clock, and a number of network transmitters.

23. The method of claim 13, wherein the plurality of next nodes includes a first next node and further comprising:
identifying a second next node among the plurality of next nodes in the network based on the destination;
generating a second request to reserve the number of time intervals for transmitting the encrypted data to the second next node when the network reservation system generates the request to reserve the number of time intervals for transmitting the encrypted data to the plurality of next nodes;
receiving a notification of an inconsistency in the network from the first next node;
ceasing to transmit the data to the first next node; and
transmitting the data to the second next node during the number of time intervals responsive to receiving the notification of the inconsistency.

24. An apparatus comprising:
a time management system configured to receive signals from a plurality of time sources, select a signal having a desired level of accuracy from the signals, and set a reference time for a source node in a network associated with the time management system using the signal;
a network reservation system configured to identify a plurality of next nodes associated with the source node based on a destination for data to be transmitted by the source node through the network, wherein the plurality of next nodes are indirectly connected to a source node from which the data is sent to the destination via at least one other node, the destination being among the plurality of next nodes, and wherein the network reservation system is further configured to generate a request to reserve a first number of time intervals with each of the plurality of next nodes for transmitting the data and a second number of time intervals with the each of the plurality of next nodes for receiving response data, wherein a time interval is a time between transmission of the data by the source node in the network using the reference time and wherein the network reservation system is further configured to selectively implement pre-reserved paths for transmitting the data;

a network interface configured to transmit the data during the first number of time intervals to a first next node in the plurality of next nodes responsive to receiving an approval for the request from the first next node; and an inconsistency management system configured to identify an inconsistency in the network through the first next node in the plurality of next nodes, cause the network interface to cease transmitting the data to the first next node in the plurality of next nodes, and further cause the network interface to transmit the data to a second next node in the plurality of next nodes during the first number of time intervals responsive to identifying the inconsistency.

25. The apparatus of claim 24, wherein in being configured to identify the inconsistency in the network, the inconsistency management system is configured to receive a notification of the inconsistency from the first next node.

26. The apparatus of claim 24, wherein in being configured to identify the inconsistency in the network, the inconsistency management system is configured to transmit a plurality of messages to the plurality of next nodes and identify the inconsistency responsive to a number of acknowledgments to the plurality of messages not being received within a period of time.

27. The apparatus of claim 26, wherein the plurality of messages comprise a plurality of internet control message protocol messages and the number of acknowledgments comprise a number of internet control message protocol responses.

28. The apparatus of claim 24, wherein the inconsistency occurs with an additional node in the network that receives the data before the data arrives at the destination.

29. The apparatus of claim 24, wherein the source node and the first next node form a first portion of a first path for the data, and the source node and the second next node form a second portion of a second path for the data.

30. The apparatus of claim 24 further comprising:

a cryptography system configured to encrypt the data to form encrypted data prior to transmitting the data to the first next node such that the first next node receives the data and transmits the data to an additional node in the network without decrypting the data, wherein the encrypted data comprises a number of encrypted headers and an encrypted body such that all of the data is encrypted.

31. A method of managing an inconsistency in a network comprising:

receiving signals from a plurality of time sources;
selecting a signal having a desired level of accuracy from the signals;

setting a reference time for a source node in the network using the signal;

identifying a plurality of next nodes associated with the source node based on a destination for data to be transmitted by the source node through the network, wherein the plurality of next nodes are indirectly connected to a source node from which the data is sent to the destination via at least one other node, the destination being among the plurality of next nodes;

generating a request to reserve a first number of time intervals with each of the plurality of next nodes for transmitting the data and a second number of time intervals with the each of the plurality of next nodes for receiving response data, wherein a time interval is a time between transmission of the data by the source node in the network using the reference time and wherein pre-reserved paths for transmitting the data are selectively implemented;

transmitting the data during the first number of time intervals to a first next node in the plurality of next nodes responsive to receiving an approval for the request from the first next node; and responsive to identifying the inconsistency in the network through the first next node in the plurality of next nodes, ceasing transmitting the data to the first next node in the plurality of nodes and transmitting the data to a second next node in the plurality of next nodes during the first number of time intervals.

32. The method of claim 31, wherein identifying the inconsistency in the network comprises:

receiving a notification of the inconsistency from the first next node.

33. The method of claim 31, wherein identifying the inconsistency in the network comprises:

transmitting a plurality of messages to the plurality of next nodes; and responsive to a number of acknowledgments to the plurality of messages not being received within a period of time, identifying the inconsistency.

34. The method of claim 33, wherein the plurality of messages comprise a plurality of internet control message protocol messages and the number of acknowledgments comprise a number of internet control message protocol responses.

35. The method of claim 31, wherein the inconsistency occurs with an additional node in the network that receives the data before the data arrives at the destination.

36. The method of claim 31, wherein the source node and the first next node form a first portion of a first path for the data, and the source node and the second next node form a second portion of a second path for the data.

37. The method of claim 31 further comprising:

encrypting the data to form encrypted data prior to transmitting the data to the first next node such that the first next node receives the data, wherein the encrypted data comprises a number of encrypted headers and an encrypted body such that all of the data is encrypted; and transmitting the data to an additional node in the network without decrypting the data.

38. An apparatus comprising:

a time management system configured to receive signals from a plurality of time sources, select a signal having a desired level of accuracy from the signals, and set a reference time for a first node in a network associated with the time management system using the signal;

a node configuration system configured to identify, using configuration data, a plurality of next nodes associated with the first node, wherein the plurality of next nodes indirectly connect the first node to a destination via at least one other node, the destination being among the plurality of next nodes, and wherein the node configuration system is further configured to identify a first number of time intervals with each of the plurality of next nodes for receiving a request, and a second number of time intervals with the each of the plurality of next nodes for transmitting the request, wherein a time interval is a time between transmission of the request by the first node in the network using the reference time;

a network reservation system configured to receive, during the first number of time intervals, the request from a second node in the plurality of next nodes to transmit data to the first node during a third number of time intervals, determine whether the third number of time intervals is available for the first node, and send an approval to the second node during the second number of time intervals responsive to a determination that the third number of time intervals is available for the first node and wherein the network reservation system is further configured to selectively implement pre-reserved paths for transmitting the data; and a network interface configured to receive the data during the third number of time intervals.

39. The apparatus of claim 38, wherein the network interface is further configured to transmit the data to a third node in the plurality of next nodes based on the destination for the data.

40. The apparatus of claim 38, wherein the configuration data is received in a user input and comprises addresses for the plurality of next nodes and the first number of time intervals.

41. The apparatus of claim 38, wherein the configuration data is stored in a memory associated with the node configuration system and comprises addresses for the plurality of next nodes and the first number of time intervals.

42. The apparatus of claim 38, wherein the node configuration system is further configured to send a notification to the plurality of next nodes that the first node is available.

43. The apparatus of claim 42, wherein the notification is sent during the first number of time intervals.

44. The apparatus of claim 42 further comprising:
a cryptography system configured to encrypt the notification prior to sending the notification to the plurality of next nodes such that the notification is not decrypted until the notification arrives at the destination for the notification.

45. A method for configuring a node comprising:
receiving signals from a plurality of time sources;
selecting a signal having a desired level of accuracy from the signals;
setting a reference time for a first node in a network using the signal;
identifying, using configuration data, a plurality of next nodes associated with the first node, wherein the plurality of next nodes indirectly connect the first node to a destination via at least one other node, the destination being among the plurality of next nodes, and wherein the node configuration system is further configured to identify a first number of time intervals with each of the plurality of nodes for receiving a request, and a second number of time intervals with the each of the plurality of nodes for transmitting the request, wherein a time interval is a time between transmission of the request by the first node in the network using the reference time and wherein pre-reserved paths for transmitting the data are selectively implemented;
receiving, during the first number of time intervals, the request from a second node in the plurality of next nodes to transmit data to the first node during a third number of time intervals;
determining whether the third number of time intervals is available for the first node;
responsive to a determination that the third number of time intervals is available for the first node, sending an approval to the second node during the second number of time intervals; and
receiving the data during the third number of time intervals.

46. The method of claim 45, further comprising:
after receiving the data during the third number of time intervals, transmitting the data to a third node in the plurality of next nodes based on a destination for the data.

47. The method of claim 45, wherein the configuration data is received in a user input and comprises addresses for the plurality of next nodes and the first number of time intervals.

48. The method of claim 45, wherein the configuration data is stored in a memory associated with a node configuration system and comprises addresses for the plurality of next nodes and the first number of time intervals.

49. The method of claim 45 further comprising:
sending a notification to the plurality of next nodes that the first node is available.

50. The method of claim 49, wherein the notification is sent during the first number of time intervals.

51. The method of claim 49 further comprising:
encrypting the notification prior to sending the notification to the plurality of next nodes such that the notification is not decrypted until the notification arrives at the destination for the notification.

* * * * *